United States Patent
Lee et al.

(10) Patent No.: US 11,251,995 B2
(45) Date of Patent: *Feb. 15, 2022

(54) METHOD FOR PERFORMING CHANNEL ESTIMATION IN WIRELESS COMMUNICATION SYSTEM AND APPARATUS THEREFOR

(71) Applicant: LG ELECTRONICS INC., Seoul (KR)

(72) Inventors: Hyunho Lee, Seoul (KR); Duckhyun Bae, Seoul (KR); Yunjung Yi, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/641,047

(22) PCT Filed: Aug. 12, 2019

(86) PCT No.: PCT/KR2019/010230
§ 371 (c)(1),
(2) Date: Feb. 21, 2020

(87) PCT Pub. No.: WO2020/032774
PCT Pub. Date: Feb. 13, 2020

(65) Prior Publication Data
US 2021/0028961 A1    Jan. 28, 2021

Related U.S. Application Data

(60) Provisional application No. 62/830,528, filed on Apr. 7, 2019, provisional application No. 62/827,234, filed (Continued)

(51) Int. Cl.
*H04L 25/02* (2006.01)
*H04L 1/00* (2006.01)
(Continued)

(52) U.S. Cl.
CPC ........ *H04L 25/0204* (2013.01); *H04L 1/0038* (2013.01); *H04W 8/24* (2013.01);
(Continued)

(58) Field of Classification Search
CPC ............. H04L 25/0202; H04L 25/0204; H04L 25/0206; H04L 1/0036; H04L 1/0038;
(Continued)

(56) References Cited

U.S. PATENT DOCUMENTS 10,448,389 B1    10/2019  Seo et al.
2011/0267967 A1*  11/2011  Ratasuk ............... H04L 5/0053
                                                   370/252

(Continued)

FOREIGN PATENT DOCUMENTS

KR    1020150082222    7/2015
WO    WO2017010798     1/2017

OTHER PUBLICATIONS

Korean Notice of Allowance in Korean Application No. 10-2019-7031547, dated Apr. 17, 2020, 4 pages (with English translation).
(Continued)

*Primary Examiner* — Kevin D Mew
(74) *Attorney, Agent, or Firm* — Fish & Richardson P.C.

(57) ABSTRACT

Proposed is a method for performing the channel estimation of a physical downlink control channel (PDCCH) in a wireless communication system. Specifically, The method performed by a user equipment (UE) includes transmitting, to a base station, UE capability information related to the channel estimation, receiving, from the base station, information for a PDCCH monitoring span, and performing a channel estimation based on the information for the PDCCH monitoring span, wherein the UE capability information may include information for a maximum number of control
(Continued)

channel elements (CCEs) capable of being channel-estimated per PDCCH monitoring span.

14 Claims, 11 Drawing Sheets

Related U.S. Application Data on Apr. 1, 2019, provisional application No. 62/716,991, filed on Aug. 10, 2018.

(51) Int. Cl.
  *H04W 8/24* (2009.01)
  *H04W 24/08* (2009.01)
  *H04W 28/02* (2009.01)
  *H04W 72/04* (2009.01)

(52) U.S. Cl.
  CPC ....... *H04W 24/08* (2013.01); *H04W 28/0268* (2013.01); *H04W 72/042* (2013.01)

(58) Field of Classification Search
  CPC ......... H04W 8/22; H04W 8/24; H04W 8/245; H04W 24/08; H04W 28/0268; H04W 72/0406; H04W 72/0413; H04W 72/042
  See application file for complete search history.

(56) References Cited

U.S. PATENT DOCUMENTS

| | | | |
|---|---|---|---|
| 2011/0268062 A1* | 11/2011 | Ji ........................... | H04J 11/005 370/329 |
| 2016/0242203 A1 | 8/2016 | You et al. | |
| 2019/0037586 A1* | 1/2019 | Park ..................... | H04L 1/0031 |
| 2019/0215098 A1* | 7/2019 | Tiirola .............. | H04W 72/0446 |
| 2019/0306700 A1* | 10/2019 | Lin .................... | H04W 74/0833 |
| 2020/0145984 A1 | 5/2020 | Hosseini et al. | |
| 2020/0154413 A1 | 5/2020 | Hosseini et al. | |
| 2020/0169991 A1* | 5/2020 | Lin ...................... | H04W 72/10 |
| 2020/0213047 A1 | 7/2020 | Xu et al. | |
| 2020/0228267 A1 | 7/2020 | Park et al. | |
| 2020/0236699 A1* | 7/2020 | Nakashima ....... | H04W 72/1289 |
| 2020/0260466 A1 | 8/2020 | Nishio et al. | |
| 2020/0314678 A1* | 10/2020 | Lee ....................... | H04W 24/10 |
| 2020/0329389 A1* | 10/2020 | Hosseini ........... | H04W 72/0446 |
| 2021/0037607 A1* | 2/2021 | Hamidi-Sepehr ....... | H04L 5/001 |
| 2021/0160002 A1* | 5/2021 | Salah ................... | H04L 1/0038 |
| 2021/0168781 A1* | 6/2021 | Lee .................... | H04W 72/042 |

OTHER PUBLICATIONS

MediaTek Inc., "Remaining Issues on Search Space," R1-1806779. 3GPP TSG RAN WG1 Meeting #93. Busan, Korea, dated May 21-25, 2018, 5 pages.

ZTE, Sanechips, "CORESET configuration and Search space for NR-PDCCH," R1-1717511, 3GPP TSG RAN WG1 Meeting 90bis, Prague, CZ, dated Oct. 9-13, 2017, 7 pages.

ZTE, Sanechips, "NR PDCCH search space and number of BDs/ CCEs per slot," R1-1719669, 3GPP TSG RAN WG1 Meeting #91. Reno, USA, dated Nov. 27-Dec. 1, 2017, 5 pages.

ZTE, Sanechips, "NR PDCCH search space and number of BDs/ CCEs per slot," R1-1721054, 3GPP TSG RAN WG1 Meeting #91, Reno, USA, dated Nov. 27-Dec. 1, 2017, 5 pages.

Catt, "Search space design for NR-PDCCH," R1-1712393, 3GPP TSG RAN WG1 Meeting #90, Prague, Czechia, dated Aug. 21-25, 2017, 5 pages.

Huawei, HiSilicon, "Remaining issues on search space," R1-1805881, 3GPP TSG RAN WG1 Meeting #93, Busan, Korea, dated May 21-25, 2018, 7 pages.

NTT Docomo, Inc., "Search space," R1-1805048, 3GPP TSG RAN WG1 Meeting #92bis, Sanya, China, dated Apr. 16-20, 2018, 12 pages.

United States Office Action in U.S. Appl. No. 16/903,628, dated Sep. 29, 2020, 11 pages.

Office Action in Japanese Appln. No. 2020-538787, dated Nov. 2, 2021, 4 pages (with English translation).

Samsung, "DL Control for URLLC," R1-1904440, Presented at 3GPP TSG RAN WG1 #96bis, Xian, China, Apr. 8-12, 2019, 3 pages.

* cited by examiner

METHOD FOR PERFORMING CHANNEL ESTIMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/010230, filed on Aug. 12, 2019, which claims the benefit of U.S. Provisional Applications No. 62/716,991, filed on Aug. 10, 2018, No. 62/827,234, filed on Apr. 1, 2019, and No. 62/830,528, filed on Apr. 7, 2019, the contents of which are all hereby incorporated by reference herein in their entirety.

TECHNICAL FIELD

The present disclosure relates to a wireless communication system and, more particularly, to a method of reporting a maximum number of control channel elements (CCEs) capable of being channel-estimated and an apparatus supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The disclosure proposes a method of reporting a maximum number of CCEs capable of being channel-estimated in one PDCCH monitoring span.

Technical problems to be solved by the disclosure are not limited by the above-mentioned technical problems, and other technical problems which are not mentioned above can be clearly understood from the following description by those skilled in the art to which the disclosure pertains.

Technical Solution

The disclosure proposes a method for performing the channel estimation of a physical downlink control channel (PDCCH) in a wireless communication system. The method performed by a user equipment (UE) includes transmitting, to a base station, UE capability information related to the channel estimation, receiving, from the base station, information for a PDCCH monitoring span, and performing a channel estimation based on the information for the PDCCH monitoring span, wherein the UE capability information may include information for a maximum number of control channel elements (CCEs) capable of being channel-estimated per PDCCH monitoring span.

Furthermore, in the method of the disclosure, the information for the maximum number of CCEs may be determined based on at least one of the length of the PDCCH monitoring span, an interval between PDCCH monitoring spans and/or a numerology.

Furthermore, in the method of the disclosure, the maximum number of CCEs may be the number of non-overlapped CCEs.

Furthermore, in the method of the disclosure, the information for the maximum number of CCEs may be determined based on at least one of a service type, quality of service (QoS), a service requirement and/or a processing time.

Furthermore, in the method of the disclosure, the information for the maximum number of CCEs may be determined based on at least one of a physical downlink shared channel (PDSCH) processing time and/or physical uplink shared channel (PUSCH) preparation time of the UE.

Furthermore, in the method of the disclosure, the information for the maximum number of CCEs may be determined based on at least one of a transport block size, number of layers and/or number of resource blocks of a physical downlink shared channel (PDSCH) or a physical uplink shared channel (PUSCH).

Furthermore, in the method of the disclosure, a timing gap from the PDCCH to a physical downlink shared channel (PDSCH) is configured based on the information for the maximum number of CCEs.

Furthermore, a user equipment (UE) performing the channel estimation of a physical downlink control channel (PDCCH) in a wireless communication system of the disclosure includes a radio frequency (RF) unit for transmitting and receiving radio signals and a processor functionally coupled to the RF unit, wherein the processor is configured to transmit, to a base station, UE capability information related to the channel estimation, receive, from the base station, information for a PDCCH monitoring span, and perform a channel estimation based on the information for the PDCCH monitoring span. The UE capability information may include information for a maximum number of control channel elements (CCEs) capable of being channel-estimated per PDCCH monitoring span.

Furthermore, in the UE of the disclosure, the information for the maximum number of CCEs is determined based on at least one of the length of the PDCCH monitoring span, an interval between PDCCH monitoring spans and/or a numerology.

Furthermore, in the UE of the disclosure, the maximum number of CCEs may be the number of non-overlapped CCEs.

Furthermore, in the UE of the disclosure, the information for the maximum number of CCEs may be determined based on at least one of a service type, quality of service (QoS), a service requirement and/or a processing time.

Furthermore, in the UE of the disclosure, the information for the maximum number of CCEs may be determined based on at least one of a physical downlink shared channel (PDSCH) processing time and/or physical uplink shared channel (PUSCH) preparation time of the UE.

Furthermore, the information for the maximum number of CCEs may be determined based on at least one of a transport block size, number of layers and/or number of resource blocks of a physical downlink shared channel (PDSCH) or a physical uplink shared channel (PUSCH).

Furthermore, in the UE of the disclosure, a timing gap from the PDCCH to a physical downlink shared channel (PDSCH) is configured based on the information for the maximum number of CCEs.

Advantageous Effects

According to the disclosure, flexible and efficient resource utilization may be possible in various service types because a maximum number of CCEs capable of being channel-estimated in one PDCCH monitoring span is reported.

Furthermore, according to the disclosure, a low latency and high-reliability communication system can be implemented because more accurate channel estimation is performed.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

MODE FOR INVENTION

Figure 1:
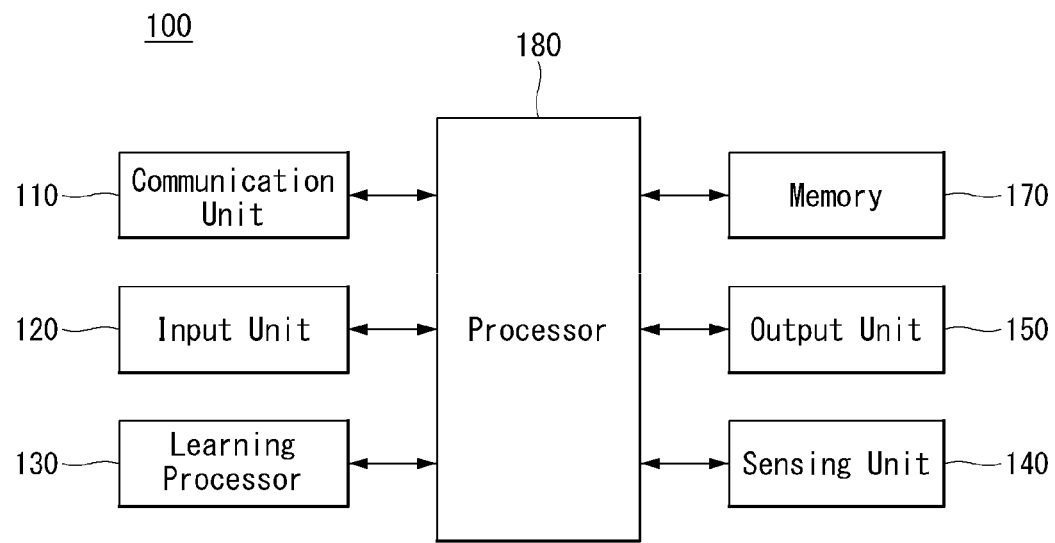
FIG. 1 is a diagram showing an AI device to which a method proposed in the disclosure may be applied.

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New RAT (NR) is primarily described for clear description, but technical features of the present disclosure are not limited thereto.

Hereinafter, examples of 5G use scenarios to which a method proposed in the disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in the disclosure may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
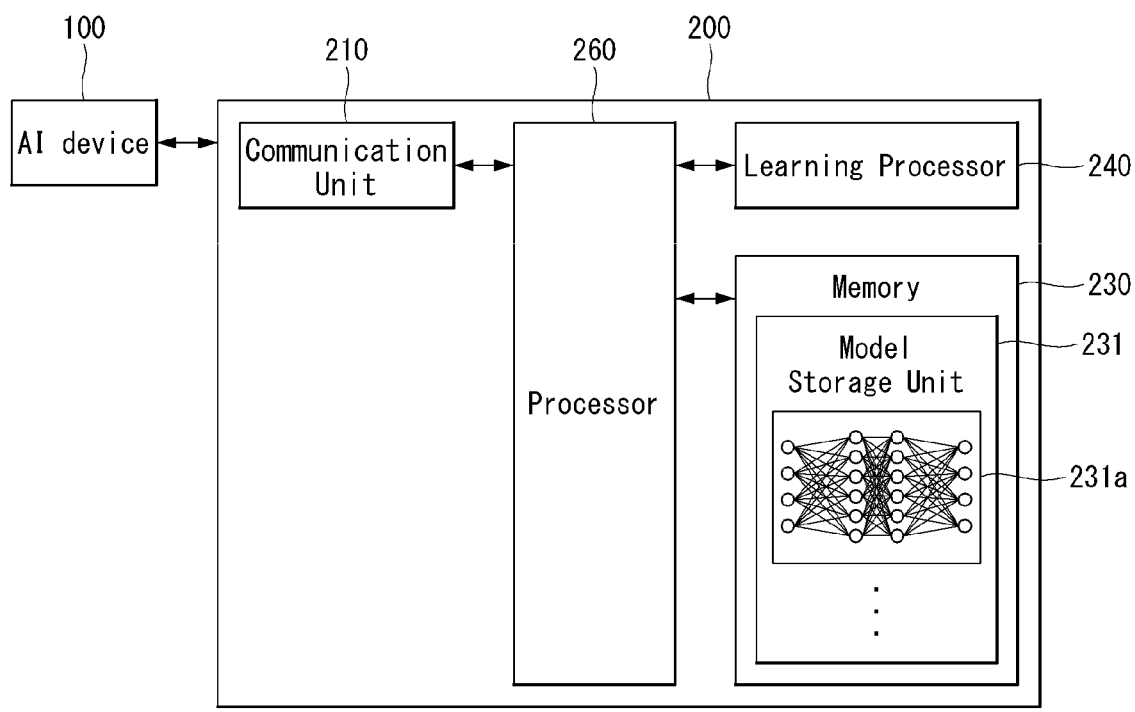
FIG. 2 is a diagram showing an AI server to which a method proposed in the disclosure may be applied.

FIG. 2 is a diagram showing the AI server 200 to which a method proposed in the disclosure may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
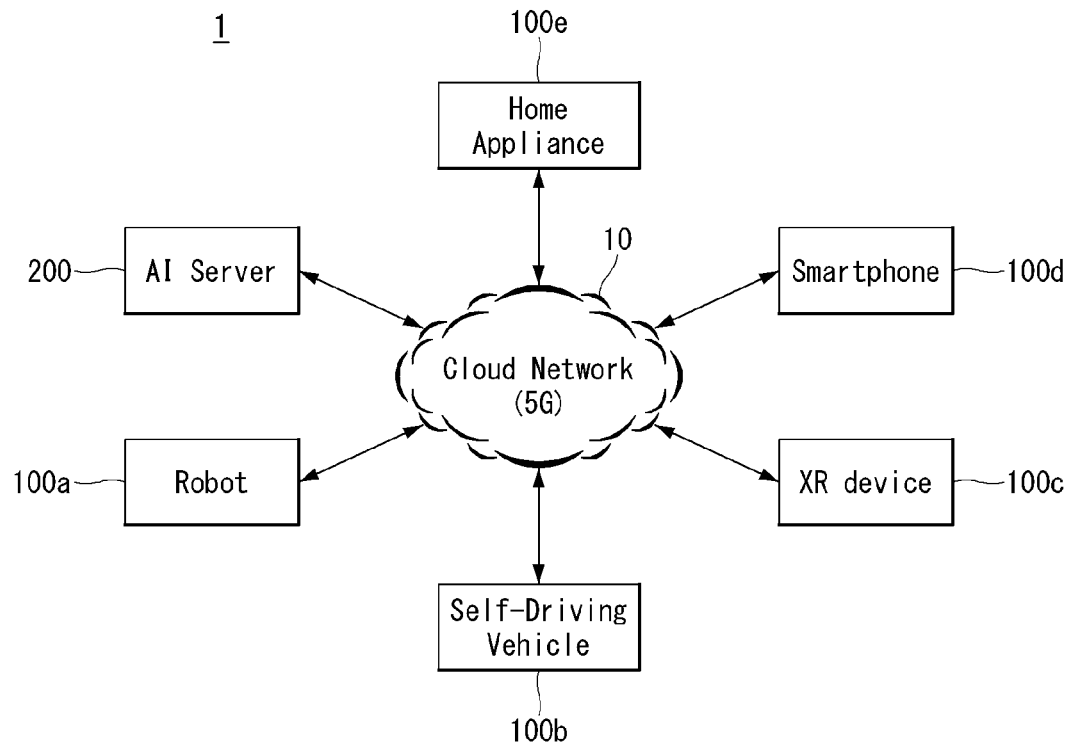
FIG. 3 is a diagram showing an AI system to which a method proposed in the disclosure may be applied.

FIG. 3 is a diagram showing an AI system 1 to which a method proposed in the disclosure may be applied.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information for a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously run along a given flow without control of a user or that autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through a LIDAR, a radar, a camera, etc.

The robot 100a interacting with the self-driving vehicle 100b is present separately from the self-driving vehicle 100*b*, and may perform an operation associated with a self-driving function inside or outside the self-driving vehicle 100*b* or associated with a user got in the self-driving vehicle 100*b*.

In this case, the robot 100*a* interacting with the self-driving vehicle 100*b* may control or assist the self-driving function of the self-driving vehicle 100*b* by obtaining sensor information in place of the self-driving vehicle 100*b* and providing the sensor information to the self-driving vehicle 100*b*, or by obtaining sensor information, generating surrounding environment information or object information, and providing the surrounding environment information or object information to the self-driving vehicle 100*b*.

Alternatively, the robot 100*a* interacting with the self-driving vehicle 100*b* may control the function of the self-driving vehicle 100*b* by monitoring a user got in the self-driving vehicle 100*b* or through an interaction with a user. For example, if a driver is determined to be a drowsiness state, the robot 100*a* may activate the self-driving function of the self-driving vehicle 100*b* or assist control of the driving unit of the self-driving vehicle 100*b*. In this case, the function of the self-driving vehicle 100*b* controlled by the robot 100*a* may include a function provided by a navigation system or audio system provided within the self-driving vehicle 100*b*, in addition to a self-driving function simply.

Alternatively, the robot 100*a* interacting with the self-driving vehicle 100*b* may provide information to the self-driving vehicle 100*b* or may assist a function outside the self-driving vehicle 100*b*. For example, the robot 100*a* may provide the self-driving vehicle 100*b* with traffic information, including signal information, as in a smart traffic light, and may automatically connect an electric charger to a filling inlet through an interaction with the self-driving vehicle 100*b* as in the automatic electric charger of an electric vehicle.

AI+Robot+XR

An AI technology and an XR technology are applied to the robot 100*a*, and the robot 100*a* may be implemented as a guidance robot, a transport robot, a cleaning robot, a wearable robot, an entertainment robot, a pet robot, an unmanned flight robot, a drone, etc.

The robot 100*a* to which the XR technology has been applied may mean a robot, that is, a target of control/interaction within an XR image. In this case, the robot 100*a* is different from the XR device 100*c*, and they may operate in conjunction with each other.

When the robot 100*a*, that is, a target of control/interaction within an XR image, obtains sensor information from sensors including a camera, the robot 100*a* or the XR device 100*c* may generate an XR image based on the sensor information, and the XR device 100*c* may output the generated XR image. Furthermore, the robot 100*a* may operate based on a control signal received through the XR device 100*c* or a user's interaction.

For example, a user may identify a corresponding XR image at timing of the robot 100*a*, remotely operating in conjunction through an external device, such as the XR device 100*c*, may adjust the self-driving path of the robot 100*a* through an interaction, may control an operation or driving, or may identify information of a surrounding object.

AI+Self-Driving+XR

An AI technology and an XR technology are applied to the self-driving vehicle 100*b*, and the self-driving vehicle 100*b* may be implemented as a movable type robot, a vehicle, an unmanned flight body, etc.

The self-driving vehicle 100*b* to which the XR technology has been applied may mean a self-driving vehicle equipped with means for providing an XR image or a self-driving vehicle, that is, a target of control/interaction within an XR image. Particularly, the self-driving vehicle 100*b*, that is, a target of control/interaction within an XR image, is different from the XR device 100*c*, and they may operate in conjunction with each other.

The self-driving vehicle 100*b* equipped with the means for providing an XR image may obtain sensor information from sensors including a camera, and may output an XR image generated based on the obtained sensor information. For example, the self-driving vehicle 100*b* includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100*b*, at least some of the XR object may be output so that it overlaps an object within a screen. For example, the self-driving vehicle 100*b* may output XR objects corresponding to objects, such as a carriageway, another vehicle, a traffic light, a signpost, a two-wheeled vehicle, a pedestrian, and a building.

When the self-driving vehicle 100*b*, that is, a target of control/interaction within an XR image, obtains sensor information from sensors including a camera, the self-driving vehicle 100*b* or the XR device 100*c* may generate an XR image based on the sensor information. The XR device 100*c* may output the generated XR image. Furthermore, the self-driving vehicle 100*b* may operate based on a control signal received through an external device, such as the XR device 100*c*, or a user's interaction.

As the spread of smartphones and IoT (Internet of Things) terminals is rapidly spreading, the amount of information exchanged through a communication network is increasing. As a result, next-generation wireless access technologies can provide faster service to more users than traditional communication systems (or traditional radio access technologies) (e.g., enhanced mobile broadband communication) Needs to be considered.

To this end, the design of a communication system that considers Machine Type Communication (MTC), which provides services by connecting a number of devices and objects, is being discussed. It is also being discussed as a multiuser of communication systems (e.g., Ultra-Reliable and Low Latency Communication, URLLC) that take into account the reliability and/or latency-sensitive services (service) and/or a user equipment.

Hereinafter, in the present disclosure, for convenience of description, the next generation radio access technology is referred to as NR (New RAT), and the radio communication system to which the NR is applied is referred to as an NR system.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

Figure 4:
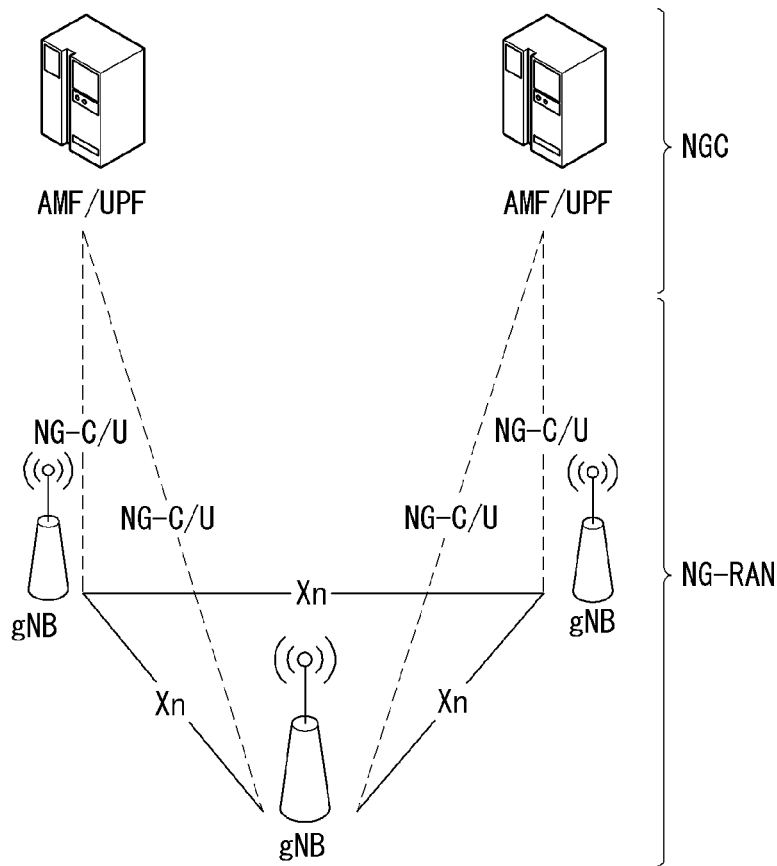
FIG. 4 illustrates an example of an overall structure of an NR system to which a method proposed in the disclosure may be applied.

FIG. 4 illustrates an example of an overall structure of an NR system to which a method proposed in the disclosure may be applied.

Referring to FIG. 4, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 5:
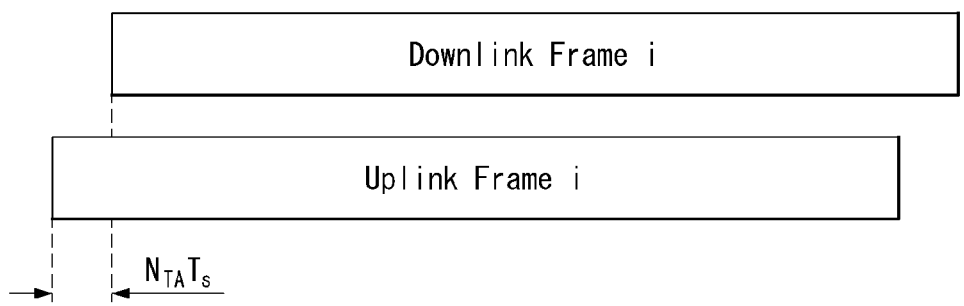
FIG. 5 illustrates the relation between an uplink frame and a downlink frame in a wireless communication system to which a method proposed in the disclosure may be applied.

FIG. 5 illustrates the relation between an uplink frame and a downlink frame in a wireless communication system to which a method proposed in the disclosure may be applied.

As illustrated in FIG. 5, uplink frame number i for transmission from a user equipment (UE) shall start $T_{TA}=N_{TA}T_s$ before the start of a corresponding downlink frame at the corresponding UE.

Regarding the numerology µ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 3 represents the number of OFDM symbols per slot, the number of slots per radio frame, and the number of slots per subframe in an extended CP.

TABLE 2

| µ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| µ | $N_{symb}^{slot}$ | $N_{slot}^{frame, \mu}$ | $N_{slot}^{subframe, \mu}$ |
|---|---|---|---|
| 2 | 12 | 40 | 4 |

Figure 6:
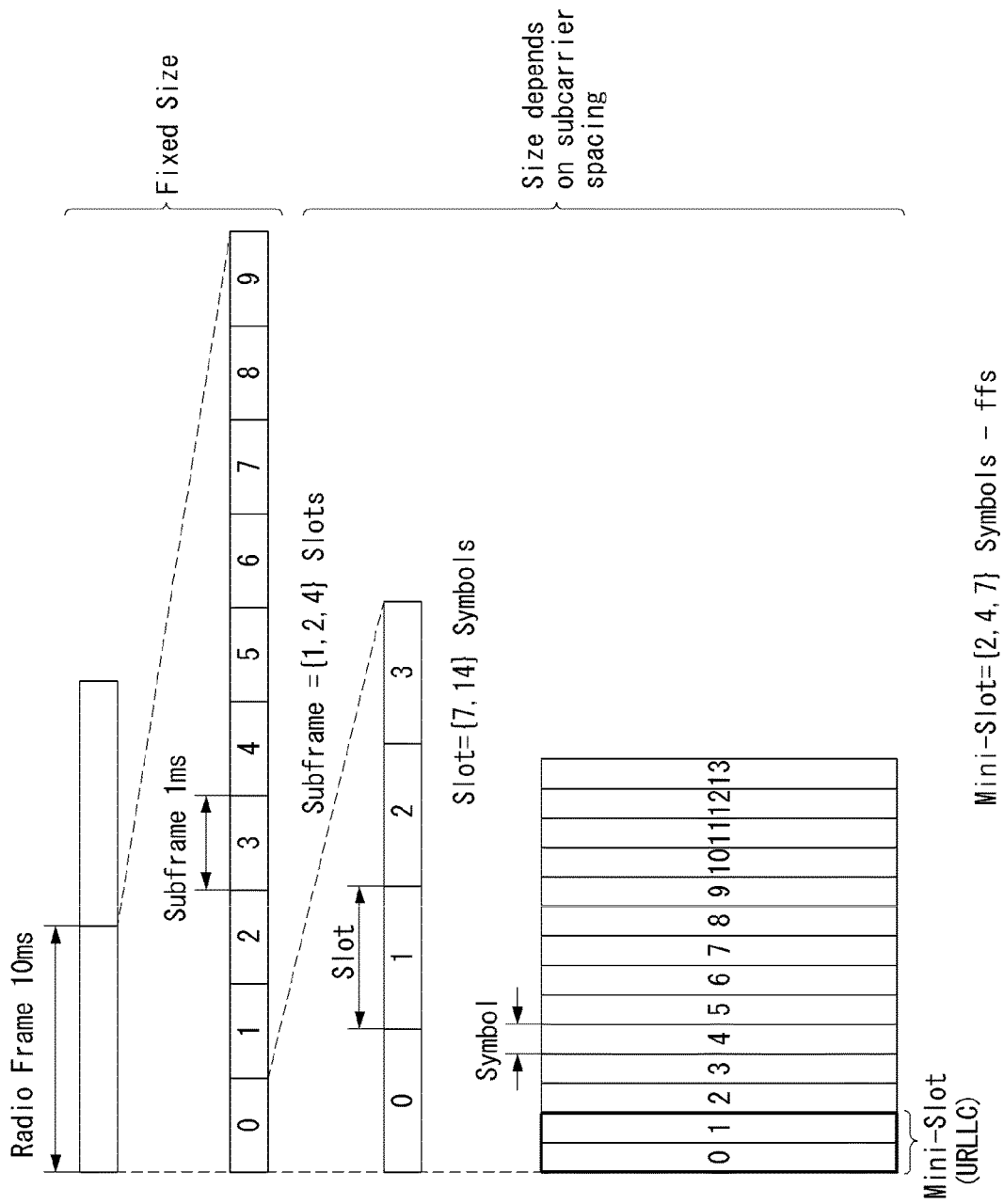
FIG. 6 illustrates an example of a frame structure in an NR system.

FIG. 6 illustrates an example of a frame structure in an NR system. FIG. 6 is merely for convenience of explanation and does not limit the scope of the disclosure.

In Table 3, in case of µ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. may be considered.

Hereinafter, the above physical resources that can be considered in the NR system are described in more detail.

First, in relation to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

Figure 7:
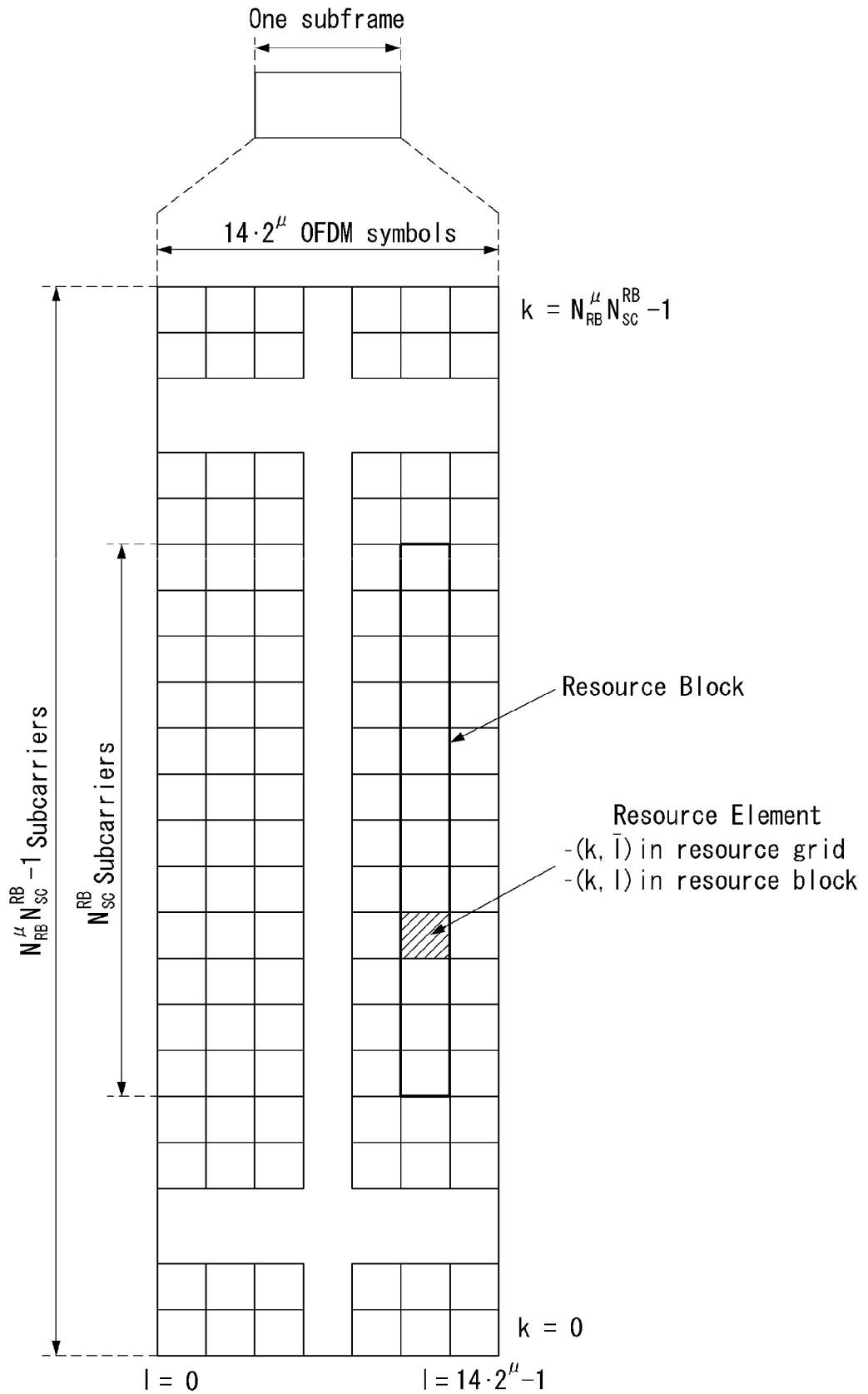
FIG. 7 illustrates an example of a resource grid supported in a wireless communication system to which a method proposed in the disclosure may be applied.

FIG. 7 illustrates an example of a resource grid supported in a wireless communication system to which a method proposed in the disclosure may be applied.

Referring to FIG. 7, a resource grid consists of $N_{RB}^{\mu} N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

Figure 8:
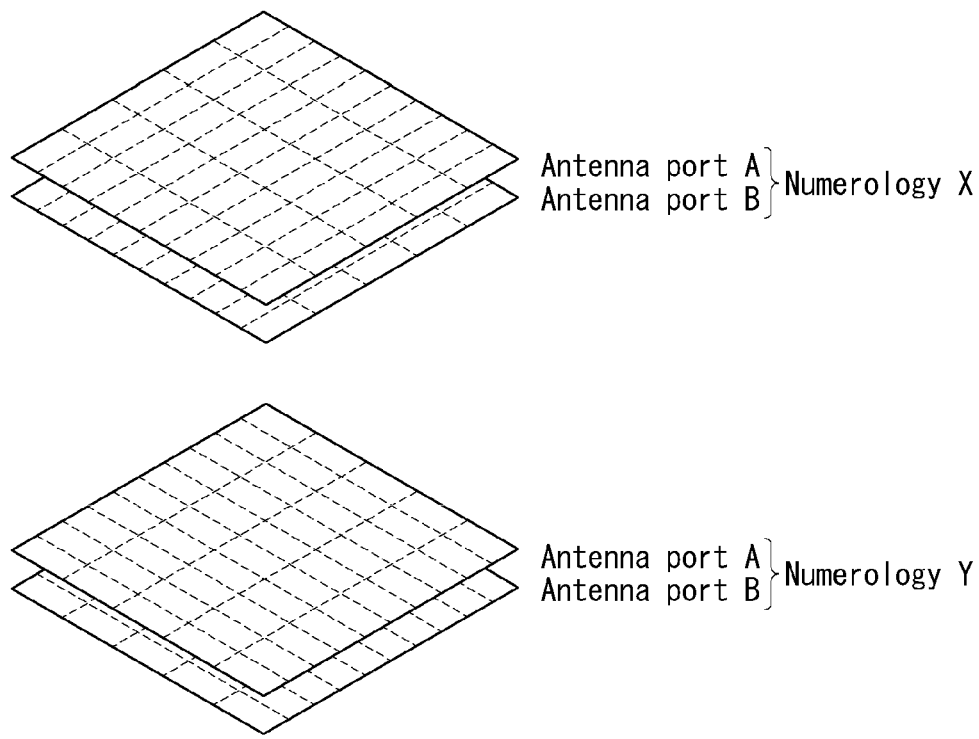
FIG. 8 illustrates examples of a resource grid per antenna port and numerology to which a method proposed in the disclosure may be applied.

In this case, as illustrated in FIG. 8, one resource grid may be configured per numerology μ and antenna port p.

FIG. 8 illustrates examples of a resource grid per antenna port and numerology to which a method proposed in the disclosure may be applied.

Each element of the resource grid for the numerology μ and the antenna port p is called a resource element and is uniquely identified by an index pair (k, l̄), where k=0, . . . , $N_{RB}^{\mu} N_{sc}^{RB}-1$ is an index on a frequency domain, and l̄=0, . . . , $2^{\mu} N_{symb}^{(\mu)}-1$ refers to a location of a symbol in a subframe. The index pair (k, l̄) is used to refer to a resource element in a slot, where l=0, . . . , $N_{symb}^{\mu}-1$.

The resource element (k, l̄) for the numerology and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad [\text{Equation 1}]$$

In this case, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad [\text{Equation 2}]$$

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

Figure 9:
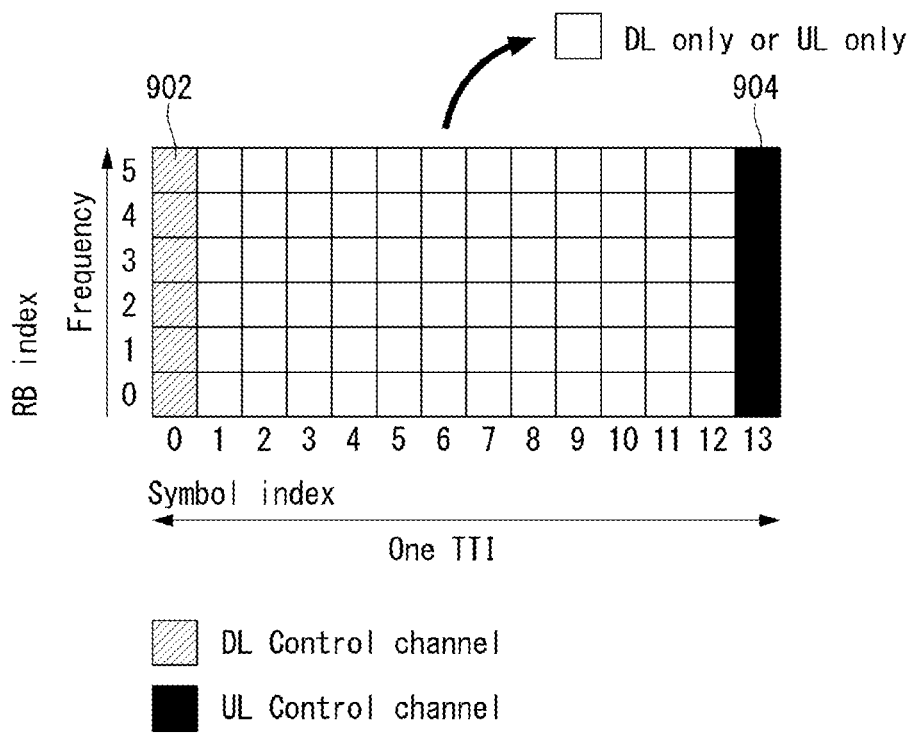
FIG. 9 illustrates an example of a self-contained structure to which a method proposed in the disclosure may be applied.

FIG. 9 illustrates an example of a self-contained structure to which a method proposed in the disclosure may be applied. FIG. 9 is merely for convenience of explanation and does not limit the scope of the disclosure.

Referring to FIG. 9, as in legacy LTE, it is assumed that one transmission unit (e.g., slot, subframe) consists of 14 orthogonal frequency division multiplexing (OFDM) symbols.

In FIG. 9, a region 902 means a downlink control region, and a region 904 means an uplink control region. Further, regions (i.e., regions without separate indication) other than the region 902 and the region 904 may be used for transmission of downlink data or uplink data.

That is, uplink control information and downlink control information may be transmitted in one self-contained slot. On the other hand, in case of data, uplink data or downlink data is transmitted in one self-contained slot.

When the structure illustrated in FIG. 9 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 9, a base station (e.g., eNodeB, eNB, gNB) and/or a user equipment (UE) (e.g., terminal) require a time gap for a process for converting a transmission mode into a reception mode or a process for converting a reception mode into a transmission mode. In relation to the time gap, if uplink transmission is performed after downlink transmission in the self-contained slot, some OFDM symbol(s) may be configured as a guard period (GP).

UE Procedure for Receiving Control Information

If a UE is configured with an SCG, the UE may need to apply the procedure, described in the pre-defined specification (e.g., 3GPP TS 38.213), to both an MCG and the SCG except PDCCH monitoring in the Type0/0A/2-PDCCH CSS set. In this case, the UE does not need to apply the procedure according to the pre-defined specification (e.g., 3GPP TS 38.213) to the SCG.

If the procedure is applied to an MCG, terms "secondary cell", "secondary cells", "serving cell" and "serving cells" in this paragraph may mean a secondary cell, secondary cells, a serving cell, and serving cells belonging to the MCG, respectively.

And/or if the procedure is applied to an SCG, terms "secondary cell", "secondary cells", "serving cell", and "serving cells" in this paragraph mean a secondary cell, secondary cells (except PSCell), a serving cell, and serving cells belonging to the SCG, respectively. In this paragraph, the term "primary cell" may mean the PSCell of an SCG.

If the monitoring of a UE means the decoding of each PDCCH candidate based on a monitored DCI format, the UE may monitor a PDCCH candidate set in one or more CORESETs on an active DL BWP on each activated serving cell configured as PDCCH monitoring based on a corresponding search space set.

If a UE receives ssb-PositionsInBurst in an SIB1 for PDCCH candidate monitoring in a slot and does not receives ssb-PositionsInBurst in ServingCellConfigCommon for a serving cell and the UE does not monitor PDCCH candidates in the Type0-PDCCH CSS set and at least one RE for a PDCCH candidate overlaps at least one RE corresponding to an SS/PBCH block index provided by ssb-PositionsInBurst of the SIB1, the UE may not need to monitor a PDCCH candidate.

And/or if a UE receives ssb-PositionsInBurst in ServingCellConfigCommo for a serving cell and the UE does not monitor a PDCCH candidate in the Type0-PDCCH CSS set and at least one RE for a PDCCH candidate overlaps at least one RE corresponding to an SS/PBCH block index provided by ssb-PositionsInBurst of ServingCellConfigCommon, the UE may not need to monitor a PDCCH candidate.

And/or if a UE monitors a PDCCH candidate for a Type0-PDCCH CSS configured in a serving cell based on a procedure described in a pre-defined specification (e.g., 3GPP TS 38.213), the UE may assume that an SS/PBCH block is not transmitted in an RE used to monitor a PDCCH candidate on a serving cell.

And/or if at least one RE of a PDCCH candidate on a serving cell overlaps at least one RE of lte-CRS-ToMatchAround, a UE may not need to monitor a PDCCH candidate.

If a UE indicates a carrier aggregation capability greater than 4 serving cells as a UE-NR-Capability, the UE may include an indication for a maximum number of PDCCH candidates, which may be monitored by the UE per slot, in the UE-NR-Capability when the UE is configured for a carrier aggregation operation over four or more cells. If a UE is not configured for an NR-DC operation, the UE may determine the capability to monitor a maximum number of PDCCH candidates per slot, which corresponds to a $N_{cells}^{cap}$ cells downlink cell.

In this case, if the UE does not provide pdcch-BlindDetectionCA, $N_{cells}^{cap}$ may be a maximum number of configured downlink cells. If not, $N_{cells}^{cap}$ cells may be a value of pdcch-BlindDetectionCA.

If a UE is configured for an NR-DC operation, the UE may determine the capability to monitor a maximum number of PDCCH candidates per slot, which corresponds to $N_{cells}^{cap}=N_{cells}^{MCG}$ downlink cells for an MCG in which $N_{cells}^{MCG}$ is provided by pdcch-BlindDetectionMCG, and may determine the capability to monitor a maximum number of PDCCH candidates per slot, which corresponds to $N_{cells}^{cap}=N_{cells}^{SCG}$ downlink cells for an SCG in which $N_{cells}^{SCG}$ is provided by pdcch-BlindDetectionSCG. If a UE is configured for a carrier aggregation operation over four or more cells or a UE is configured for an NR-DC operation, when the UE is configured for a cell group, the UE may not expect that it will monitor the number of PDCCH candidates greater than a maximum number, derived from a corresponding value of $N_{cells}^{cap}$, per slot.

When a UE is configured for an NR-DC operation as a total number of $N_{NR-DC}^{DL,cells}$ downlink cells in both an MCG and an SCG, the UE may expect that a value satisfying the following will be provided in pdcch-BlindDetectionMCG and pdcch-BlindDetectionSCG.

If the UE reports pdcch-BlindDetectionCA, pdcch-BlindDetectionMCG+pdcch-BlindDetectionSCG<=pdcch-BlindDetectionCA or If the UE does not report pdcch-BlindDetectionCA, pdcch-BlindDetectionMCG+pdcch-BlindDetectionSCG<=$N_{NR-DC}^{DL,cells}$ If the UE is configured for an NR-DC operation, the UE may indicate maximum values of pdcch-BlindDetectionMCG and pdcch-BlindDetectionSCG through pdcch-BlindDetectionMCG-UE and pdcch-BlindDetectionSCG-UE, respectively. If the UE reports pdcch-BlindDetectionCA, a value range of pdcch-BlindDetectionMCG-UE or pdcch-BlindDetectionSCG-UE is [1, . . . , pdcch-BlindDetectionCA-1], pdcch-BlindDetectionMCG-UE+pdcch-BlindDetectionSCG-UE>=pdcch-BlindDetectionCA.

If not, if $N_{NR-DC,max}^{DL,cells}$ is a maximum number of downlink cells which may be configured in both an MCG and an SCG as described in a pre-defined specification (e.g., 3GPP TS 38.133), a value range of pdcch-BlindDetectionMCG-UE or pdcch-BlindDetectionSCG-UE is [1, 2, 3], pdcch-BlindDetectionMCG-UE+pdcch-BlindDetectionSCG-UE>=$N_{NR-DC,max}^{DL,cells}$.

UE Procedure for Determining Physical Downlink Control Channel Allocation

A PDCCH candidate set to be monitored by a UE may be defined as a PDCCH search space set. The search space set may be a CSS set or a USS set. The UE may monitor a PDCCH candidate in one or more of the following search space sets.

a Type0-PDCCH CSS set configured by searchSpaceZero of PDCCH-ConfigCommon for a DCI format having CRC scrambled by pdcch-ConfigSIB1 in an MIB or by searchSpaceSIB1 of PDCCH-ConfigCommon or by an SI-RNTI in the primary cell of an MCG, a Type0A-PDCCH CSS set configured by searchSpaceOtherSystemInformation of PDCCH-ConfigCommon for a DCI format scrambled by CRC by an SI-RNTI in the primary cell of an MCG, a Type1-PDCCH CSS set configured by ra-SearchSpace of PDCCH-ConfigCommon for a DCI format having CRC scrambled by the RA-RNTI or TC-RNTI of a primary cell, a Type2-PDCCH CSS set configured by pagingSearchSpace of PDCCH-ConfigCommon for a DCI format having CRC scrambled by a P-RNTI in the primary cell of an MCG, a Type3-PDCCH CSS set configured as SearchSpace in PDCCH-Config as searchSpaceType=common with respect to a DCI format having CRC scrambled by an INT-RNTI, an SFI-RNTI, a TPC-PUSCH-RNTI, a TPC-PUCCH-RNTI or a TPC-SRS-RNTI and by a C-RNTI, an MCS-C-RNTI or a CS-RNTI for only a primary cell, and a USS set configured by SearchSpace in PDCCH-Config as searchSpaceType=UE-Specific with respect to a DCI format having CRC scrambled by a C-RNTI, an MCS-C-RNTI, an SP-CSI-RNTI or a CS-RNTI(s).

In the case of a DL BWP, if searchSpace-SIB1 for a Type0-PDCCH CSS configured by PDCCH-ConfigCommon is not provided to the UE, the UE may not monitor a PDCCH candidate for the Type0-PDCCH CSS configured on the DL BWP. A Type0-PDCCH CSS set may be defined by the number of PDCCH candidates per CCE aggregation level and CCE aggregation level given in Table 4. If an active DL BWP and an initial DL BWP have the same SCS and the same CP length and the active DL BWP includes all the RBs of a CORESET having an index 0 or the active DL BWP is an initial DL BWP, a CORESET configured by the Type0-PDCCH CSS set may have a CORESET index 0, and the Type0-PDCCH CSS set may have a search space set index 0.

In the case of a DL BWP, if a UE is not provided with searchSpaceOtherSystem Information for a Type0A-PDCCH CSS set, the UE may not monitor a PDCCH for the Type0A-PDCCH CSS configured in the DL BWP. A CCE aggregation level and the number of PDCCH candidates per CCE aggregation level for the Type0A-PDCCH CSS set may be given in Table 4.

In the case of a DL BWP and a Type1-PDCCH CSS set, a UE may be provided with a configuration for a search space by ra-SearchSpace. If a UE set is not provided with a Type3-PDCCH CSS set or USS and the UE receives a C-RNTI, the UE may monitor a PDCCH candidate for a DCI format 0_0 and a DCI format 1_0 along with a CRC scrambled by a C-RNTI in the Type1-PDCCH CSS set.

If a UE is not provided with pagingSearchSpace for a Type2-PDCCH CSS set, the UE may not monitor a PDCCH for the Type2-PDCCH CSS configured on a DL BWP. A CCE aggregation level and the number of PDCCH candidates per CCE aggregation level for the Type2-PDCCH CSS set may be the same as Table 4.

If a UE is provided with a value 0 in searchSpaceID of PDCCH-ConfigCommon for a Type0/0A/2-PDCCH CSS set, the UE may determine monitoring timing for PDCCH candidate of the Type0/0A/2-PDCCH CSS set as described in a pre-defined specification (e.g., 3GPP TS 38.213). In the case of a DCI format having CRC scrambled by a C-RNTI, a UE may monitor a corresponding PDCCH candidate only at monitoring timing related to an SS/PBCH block.

If a UE monitors a PDCCH candidate for a DCI format having CRC scrambled by a C-RNTI and the UE is provided with a value not 0 with respect to searchSpaceID of PDCCH-ConfigCommon for a Type0/0A/2-PDCCH CSS set, the UE may determine a monitoring occasion for the PDCCH candidates of the Type0/0A/2-PDCCH CSS set based on a search space set associated with a value of searchSpaceID.

A UE may assume whether a TCI state indicative of quasi co-location information of a DM-RS antenna port for PDCCH reception is not provided to the UE in a CORESET when DM-RS antenna port related to the PDCCH reception of the CORESET configured by pdcch-ConfigSIB1 in an MIB and corresponding PDSCH reception and a corresponding SS/PBCH block have a quasi-co-location relation in relation to an average gain, QCL-TypeA and QCL-TypeD attributes and a pre-defined specification (e.g., 3GPP TS 38.214) is applied. A value of DM-RS scrambling sequence initialization may be a cell ID. A SCS may be provided by subCarrierSpacingCommon by the MIB.

If a DM-RS for monitoring a PDCCH in a Type1-PDCCH CSS set does not have the same QCL-TypeD characteristics as a DM-RS for monitoring a PDCCH in a Type0/0A/2/3-PDCCH CSS set or USS set for a single cell operation or a carrier aggregation operation in the same frequency band, a UE may not expect that it will monitor a PDCCH in the Type0/0A/2/3-PDCCH CSS set or USS set. If a PDCCH or a related PDSCH overlaps a PDCCH in at least one symbol, a UE may monitor a PDCCH in a Type1-PDCCH CSS set or as a related PDSCH.

If a UE is provided with one or more search space sets, and a C-RNTI, an MCS-C-RNTI, or a CS-RNTI based on corresponding one or more of searchSpaceZero, searchSpaceSIB1, searchSpaceOtherSystemInformation, pagingSearchSpace, and ra-SearchSpace, the UE may monitor a PDCCH candidate for a DCI format 0_0 and a DCI format 1_0 based on CRC scrambled by a C-RNTI, an MCS-C-RNTI or a CS-RNTI in one or more search space sets within a slot. In this case, the UE may monitor a PDCCH candidate for at least the DCI format 0_0 or DCI format 1_0 based on CRC scrambled by an SI-RNTI, an RA-RNTI or a P-RNTI.

If a UE is provided with one or more search space sets, and an SI-RNTI, a P-RNTI, an RA-RNTI, an SFI-RNTI, an INT-RNTI, a TPC-PUSCH-RNTI, a TPC-PUCCH-RNTI, or a TPC-SRS-RNTI based on corresponding one or more of searchSpaceZero, searchSpaceSIB1, searchSpaceOtherSystemInformation, pagingSearchSpace, ra-SearchSpace or a CSS set configured by PDCCH-Config, the UE may not expect that it will process information from one or more DCI formats having CRC scrambled by an RNTI per slot with respect to one of RNTIs.

Table 4 illustrates CCE aggregation levels and maximum numbers of PDCCH candidates per CCE aggregation level for a CSS set configured by searchSpace-SIB1.

TABLE 4

| CCE Aggregation Level | Number of Candidates |
| --- | --- |
| 4 | 4 |
| 8 | 2 |
| 16 | 1 |

If monitoringSymbolsWithinSlot indicates that a UE has to monitor a PDCCH in the subset of a maximum of the same 3 consecutive symbols in all slots with respect to the UE, the UE may not expect that the subset will be configured as a PDCCH SCS other than 15 kHz if the subset includes at least one symbol after a third symbol.

A UE may not expect that the first symbol and a plurality of consecutive symbols for a CORESET that enables a PDCCH candidate to be mapped to the symbols of different slots will be provided.

A UE may not expect two PDCCH monitoring occasions for the same search space set or another search space set on an active DL BWP in the same CORESET separated by the number of symbols not 0 smaller than CORESET duration.

A UE may determine a PDCCH monitoring occasion on an active DL BWP from a PDCCH monitoring span within a slot, a PDCCH monitoring offset and a PDCCH monitoring pattern. With respect to a search space set S, if $(n_f N_{slot}^{frame,\mu} + n_{s,f}^{\mu} - o_s) \bmod k_s = 0$, a UE may determine that a PDCCH monitoring occasion(s) is present in a slot having a number $n_{s,f}^{\mu}$ in a frame having a number $n_f$. The UE may monitor PDCCH candidates for the search space set S with respect to consecutive slots $T_s$, starting from a slot $n_{s,f}^{\mu}$, and may not monitor PDCCH candidates for the search space set S with respect to $k_s - T_s$ consecutive slots.

The USS of a CCE aggregation level $L \in \{2, 4, 8, 16\}$ may be defined by a PDCCH candidate set for a CCE aggregation level L.

If a UE is configured with CrossCarrierSchedulingConfig for a serving cell, a carrier indicator field value may correspond to a value indicated by CrossCarrierSchedulingConfig.

If a UE is not configured with a carrier indicator field with respect to the active DL BWP of a serving cell in which the UE monitors a PDCCH candidate in a USS, the UE may monitor PDCCH candidates without a carrier indicator field.

If a UE is configured with a carrier indicator field with respect to the active DL BWP of a serving cell in which the UE monitors a PDCCH candidate in a USS, the UE may monitor PDCCH candidates using the carrier indicator field.

If a UE is configured to monitor PDCCH candidates using a carrier indicator field corresponding to a secondary cell in another serving cell, the UE may not expect that it will monitor a PDCCH candidate in the active DL BWP of a secondary cell. With respect to the active DL BWP of a serving cell in which a UE monitors PDCCH candidates, the UE may monitor a PDCCH candidate for at least the same serving cell.

A UE may expect that it will monitor a PDCCH candidate for a maximum size of 4 DCI formats including a maximum of three DCI formats based on CRC scrambled by a C-RNTI per serving cell. The UE may count a plurality of sizes for a DCI format per serving cell based on a plurality of configured PDCCH candidates in each search space set for a corresponding active DL BWP.

In the CORESET p of an active DL BWP for a serving cell $n_{CI}$, a PDCCH candidate having an index $m_{s_j,n_{CI}}$ for a search space set $s_j$ may not be counted for monitoring using a CCE set. If a PDCCH candidate having an index $m_{s_i,n_{CI}}$ for a search space set $s_i < s_j$ is present or a PDCCH candidate having the index $m_{s_i,n_{CI}}$ and $n_{s_i,n_{CI}} < m_{s_j,n_{CI}}$ is present, a PDCCH candidate may have the same scrambling and a DCI format corresponding to the PDCCH candidate may have the same size in the CORESET p of an active DL BWP for a serving cell $n_{CI}$ using the same CCE set. If not, a PDCCH candidate having an index $m_{s_j,n_{CI}}$ may be counted for monitoring.

Table 5 provides a maximum number of monitored PDCCH candidates ($M_{PDCCH}^{max,slot,\mu}$) with respect to a DL BWP having an SCS configuration $\mu$ for a UE per slot for the purpose of an operation with a single serving cell.

Table 5 illustrates a maximum number $M_{PDCCH}^{max,slot,\mu}$ of monitored PDCCH candidates per slot with respect to a DL BWP having an SCS configuration $\mu \in \{0, 1, 2, 3\}$ for a single serving cell.

TABLE 5

| $\mu$ | Maximum number of monitored PDCCH candidates per slot and per serving cell $M_{PDCCH}^{max,\ slot,\ \mu}$ |
|---|---|
| 0 | 44 |
| 1 | 36 |
| 2 | 22 |
| 3 | 20 |

Table 6 may provide a maximum number r $C_{PDCCH}^{max,slot,\mu}$ of non-overlap CCEs for a DL BWP that uses an SCS configuration $\mu$ in which a UE expects to monitor a corresponding PDCCH candidate per slot for an operation with a single serving cell.

If CCEs correspond to different CORESET indices or the first different symbols for the reception of each PDCCH candidate, CCEs for the PDCCH candidate may not overlap.

Table 6 illustrates a maximum number of CCEs $C_{PDCCH}^{max,slot,\mu}$ that do not overlap per slot with respect to a DL BWP having an SCS configuration $\mu \in \{0, 1, 2, 3\}$ for a single serving cell.

TABLE 6

| $\mu$ | Maximum number of non-overlap CCEs per slot and per serving cell $C_{PDCCH}^{max,\ slot,\ \mu}$ |
|---|---|
| 0 | 56 |
| 1 | 56 |
| 2 | 48 |
| 3 | 32 |

If a UE is configured with $N_{cells}^{DL,\mu}$ downlink cells having DL BWPs having an SCS configuration $\mu$ (in this case, $$\sum_{\mu=0}^{3} N_{cells}^{DL,\mu} \leq N_{cells}^{cap} \Bigg),$$

the UE may not need to monitor $M_{PDCCH}^{total,slot,\mu} = M_{PDCCH}^{max,slot,\mu}$ PDCCH candidates or more or $C_{PDCCH}^{total,slot,\mu} = C_{PDCCH}^{max,slot,\mu}$ non-overlap CCEs or more per slot with respect to each scheduled cell on the active DL BWP of a scheduling cell.

If a UE is configured with $N_{cells}^{DL,\mu}$ downlink cells having DL BWPs having an SCS configuration $\mu$ (in this case, $$\sum_{\mu=0}^{3} N_{cells}^{DL,\mu} \leq N_{cells}^{cap} \Bigg),$$

the DL BWP of an activated cell is the active DL BWP of the activated cell, and the DL BWP of a deactivated cell is a DL BWP having an index provided by firstActiveDownlinkBWP-Id for the deactivated cell, the UE may not need to monitor $$M_{PDCCH}^{total,slot,p} = \left\lfloor N_{cells}^{cap} \cdot M_{PDCCH}^{max,shot,\mu} \cdot N_{cells}^{DL,\mu} \Big/ \sum_{j=0}^{3} N_{cells}^{DL,j} \right\rfloor$$

PDCCH candidates or more or $$C_{PDCCH}^{total,slot,p} = \left\lfloor N_{cells}^{cap} \cdot C_{PDCCH}^{max,shot,\mu} \cdot N_{cells}^{DL,\mu} \Big/ \sum_{j=0}^{3} N_{cells}^{DL,j} \right\rfloor$$

non-overlap CCEs or more per slot on the active DL BWP(s) of a scheduled cell(s) from $N_{cells}^{DL,\mu}$ downlink cells.

With respect to each scheduled cell, a UE may not need to monitor $\min(M_{PDCCH}^{max,slot,\mu}, M_{PDCCH}^{total,slot,\mu})$ PDCCH candidates or more or $\min(C_{PDCCH}^{max,slot,\mu}, C_{PDCCH}^{total,slot,\mu})$ non-overlap CCEs or more per slot on an active DL BWP having the SCS configuration $\mu$ of a scheduled cell.

A UE may not expect that monitored PDCCH candidates exceeding a corresponding maximum number per slot and configured CSS sets reaching a corresponding total number per scheduled cell of non-overlap CCEs per slot will be present.

With respect to the same cell scheduling or cross-carriers scheduling having DL BWPs in which a scheduling cell and a scheduled cell(s) have the same SCS configuration $\mu$, a UE may not expect that the number of PDCCH candidates and the corresponding number of PDCCH candidates per slot on a secondary cell will be greater than a corresponding number that may be monitored by the UE on a secondary cell per slot.

The number of PDCCH candidates and the number of non-overlap CCEs per slot for monitoring may be separately counted for each scheduled cell with respect to cross-carriers scheduling.

With respect to all search space sets within a slot n, a set of CSS sets having cardinality of $I_{css}$ may be indicated as $S_{css}$, a set of USS sets having cardinality of $J_{uss}$ may be indicated as $S_{uss}$. The location of the USS sets $S_j$ ($0 \le j < J_{uss}$) in $S_{uss}$ may follow ascending order of a search space set index.

The number of PDCCH candidates counted during monitoring for a CSS set $S_{css}(i)$ may be indicated as $M_{S_{uss}(i)}^{(L)}$ ($0 \le i < I_{css}$), and the number of PDCCH candidates counted during monitoring for a USS set $S_{uss}(j$. may be indicated as $M_{S_{uss}(j)}^{(L)}$ ($0 \le j < J_{uss}$).

With respect to CSS sets, a UE may monitor $$M_{PDCCH}^{CSS} = \sum_{i=0}^{-css-} \sum_{L} M_{S_{CSS}(i)}^{(L)}$$

PDCCH candidates that require a total number $C_{PDCCH}^{CSS}$ of non-overlap CCEs within a slot.

A UE may allocate PDCCH candidates for monitoring to USS sets for a primary cell having an active DL BWP including an SCS configuration μ in a slot n based on a pseudo-code. The UE may not expect that it will monitor a PDCCH in the USS set without the allocated PDCCH candidates for monitoring.

A set of non-overlap CCEs for a search space set $S_{uss}(j)$ may be indicated as $V_{CCE}(S_{uss}(j))$, and cardinality of $V_{CCE}(S_{uss}(j))$ may be indicated as $\partial(V_{CCE}(S_{uss}(j)))$. In this case, the non-overlap CCEs for the search space set $s_{uss}(j)$ may be determined by considering allocated PDCCH candidates for monitoring for CCS sets and PDCCH candidates for monitoring allocated for all the search space sets $s_{uss}(k)$ ($0 \le k \le j$).

With respect to a scheduled cell, a UE may expect that it will receive a maximum of 16 PDCCHs for DCI formats 1_0 or 1_1 based on CRC scrambled by a C-RNTI, a CS-RNTI, or an MCS-RNTI that schedules 16 PDSCH receptions indicating that the UE has not received any corresponding PDSCH symbol and a maximum of 16 PDCCHs for a DCI format 0_0 or format 0_1 using CRC scrambled by a C-RNTI, a CS-RNTI, or an MCS-RNTI that schedules 16 PUSCH transmissions indicating that the UE has not transmitted any corresponding PUSCH symbol.

When a UE detects a DCI format having inconsistent information, the UE may discard all of pieces of information in the DCI format.

A UE configured with a bandwidth part indicator in a DCI format 0_1 or format 1_1 may determine DCI information which may be applied to each of a new active DL BWP or UL BWP as described in a pre-defined specification (e.g., 3GPP TS 38.213) in the case of an active DL BWP or active UL BWP change.

If a UE is not configured with PUSCH and/or PUCCH transmission in a serving cell $c_2$ with respect to an unpaired spectrum operation, if the PDCCH overlaps SRS transmission (including any interruption due to an uplink or downlink RF returning time) within a time in the serving cell $c_2$ and the UE is incapable of simultaneous reception and transmission in a serving cell $c_1$ and the serving cell $c_2$, the UE may not expect to monitor a PDCCH in the serving cell $c_1$.

If a UE is provided with resource blocks and symbolsInResourceBlock in RateMatchPattern or the UE is additionally provided with periodicityAndPattern in RateMatchPattern, the UE may determine an RB set in the symbols of a slot which cannot use PDSCH reception as described in a pre-defined specification (e.g., 3GPP TS 38.214). If a PDCCH candidate in the slot is mapped to one or more Res overlapping the REs of any RB in the RB set in the symbols of the slot, the UE may not expect to monitor a PDCCH candidate.

A next-generation wireless communication system uses a wide frequency band and aims to support various services or requirements. For example, a new radio (NR) requirement of 3GPP is described below. In the case of ultra reliable and low latency communications (URLLC), that is, one of representative scenarios, a user plane latency time of 0.5 ms and a low latency and high reliability requirement that data of X bytes needs to be transmitted within a 10^-5 error rate within 1 ms may be necessary.

Furthermore, unlike an enhanced mobile broadband (eMBB) having a great traffic capacity, in traffic of URLLC, a file size is within tens to hundreds of bytes and is sporadically generated.

Accordingly, transmission that maximizes a transfer rate and minimizes overhead of control information is necessary for eMBB. In contrast, a short scheduling time unit and a reliable transmission method are necessary for URLLC.

A reference time unit assumed and/or used to transmit and receive physical channels may be variously configured depending on an application field or the type of traffic. The reference time may be a basic unit that schedules a specific physical channel. The reference time unit may be different depending on the number of symbols and/or subcarrier spacing that configures the corresponding scheduling unit.

The disclosure is described based on a slot and a mini-slot as a reference time unit, for convenience of description. The slot may be a scheduling basic unit used for common data traffic (e.g., eMBB), for example.

The mini-slot may have timing duration smaller than a slot in a time domain and may be a scheduling basic unit used in a traffic or communication method (e.g., URLLC, unlicensed band or millimeter wave) having a further special purpose.

However, this is merely an example. It is evident that a method proposed in the disclosure may be extended and applied to a case where physical channels are transmitted and received based on a mini-slot in eMBB and/or physical channel transmission and reception are performed based on a slot in URLLC or another communication scheme.

Hereinafter, the disclosure proposes methods related to blind decoding.

Specifically, the disclosure proposes a method of decoding a PDCCH candidate of a high aggregation level or decoding a PDCCH candidate by considering a service type (hereinafter a first embodiment) and a method of reporting a UE capability related to a blind decoding operation (hereinafter a second embodiment).

Hereinafter, embodiments described in the disclosure have been divided for convenience of description, and some methods and/or some elements of any embodiment may be substituted with a method and/or element of another embodiment or may be mutually combined and applied.

Furthermore, hereinafter, a slot, a subframe and a frame described in embodiments mentioned in the disclosure may correspond to detailed examples of given time units used in a wireless communication system. That is, in applying methods proposed in the disclosure, a time unit may be substituted and applied as other time units applied to another wireless communication system.

Furthermore, hereinafter, a monitoring occasion described in embodiments mentioned in the disclosure may be referred to as a monitoring span or a monitoring span.

Furthermore, hereinafter, the number of CCEs described in embodiments mentioned in the disclosure may mean the number of non-overlap (non-overlapping) CCEs.

First Embodiment

First, a method of decoding a PDCCH candidate of a high aggregation level or decoding a PDCCH candidate by considering a service type is described specifically.

In a next-generation system, a rule for restricting the number of PDCCH candidates attempted by a UE for blind decoding per slot and the number of channel estimations performed by a UE for PDCCH demodulation has been defined for purposes, such as the support of various service requirements and/or flexible and efficient resource utilization.

For the more reliable transmission of a PDSCH, the reliability of a PDCCH that schedules a PDSCH also need to be improved. To this end, a scheme for supporting a PDCCH candidate (e.g., AL=16) of a greater aggregation level (AL) may be considered. A case where a resource for transmitting a PDCCH candidate corresponding to such a great AL in a specific control resource set (CORESET) may occur. If a corresponding candidate is split during specific timing duration or skipped, scheduling latency and/or a limit may be caused.

Accordingly, if a resource for transmitting a PDCCH candidate corresponding to a specific AL (e.g., AL=16) in a specific CORESET is insufficient, a rule on which a UE considers a possible control channel element (CCE) as a candidate and performs decoding may be defined, agreed and/or configured. In this case, the UE may perform decoding by recognizing some of corresponding PDCCH candidates to have been puncturing or rate-matched. The operation may be applied to only a case of a specific AL and/or a specific search space set.

And/or a rule on which a UE performs an operation of decoding such a partial candidate only if the partial candidate is a given portion or more of the number of CCEs corresponding to the AL of a PDCCH candidate may be defined, agreed and/or configured. The reason for this is that in the case of a PDCCH candidate having a too small number of CCEs, it may be impossible to decode the original information from the PDCCH candidate. Information on the portion may be defined as a UE capability and reported to a base station. That is, the UE may consider that it can perform decoding only if CCEs greater than a portion reported for a PDCCH candidate of a specific AL is secured.

A base station may check whether a corresponding UE will perform blind decoding on a partial candidate remained in a specific portion using the capability information, and may transmit downlink control information (DCI). And/or the information for the portion may be pre-defined and/or may be configured by a base station through a high layer signal.

And/or in order to implement such an operation, the following operation may be considered.

Although the number of all CCEs of a CORESET corresponding to AL=X (the highest AL value set for a search space set) does not satisfy X, if alpha*X (e.g., alpha=0.8) is satisfied, it may be assumed that a candidate mapped to all CCEs corresponding the entire CORESET is present. If one or more candidates are mapped to AL=X, it is assumed that only one candidate is monitored. It may be assumed that hashing for AL=X is not applied (i.e., starting CCE=0) or is applied and wrapped around and mapped. Assuming that a total number of CCEs is Y, an operation may be performed assuming that CCEs corresponding to X-Y have been rate-matched.

And/or a separate configuration may be added to a search space set configuration. If a corresponding configuration is added, this may mean that a UE additionally monitors a candidate corresponding to hashing=0 by considering that the candidate has been rate-matched with the number of available CCEs within a CORESET associated with a corresponding search space set as described above with respect to an AL L most not smaller than the number of CCEs.

And/or if a candidate corresponding to X is skipped due to a collision with a resource or an SSB rate-matched with a corresponding CORESET with respect to the highest AL=X, the corresponding candidate skip has a great influenced on a specific service (e.g., URLLC). It may be assumed that a rate-matching operation instead of a candidate skip is performed on AL=X. Characteristically, a UE may apply this to a resource to be rate-matched based on a semi-statistical and/or dynamic indication. For example, upon rate-matching resource indication of a PDSCH through layer 1 (L1) signaling, a portion overlapped with the corresponding resource or a scheduled PDSCH region may be rate-matched with a control region (or control). Such an operation may be enabled and/or disabled depending on the configuration. Alternatively, to configure rate matching to be used instead of a candidate skip with respect to a specific search space set rather than to limit AL=X may be considered.

And/or characteristically, such an operation may be performed on only a ZP-CSI-RS and non zero power (NZP)-CSI-RS among a rate matching resource, a PDSCH, and zero power (ZP)-channel state information (CSI)-reference signal (RS). Particularly, this may be useful if it is difficult to avoid the transmission of a CSI-RS and the overlap of a synchronization signal set (SS SET) when a monitoring occasion is repeated several times within one slot. Rate-matching may make a resource element (RE) level or empty all CSI-RS transmission symbols. Although a control region (or Control) is rate-matched, the last OFDM symbol of a specific DCI and/or PDCCH uses the last symbol of a CORESET associated with a monitored search space set as a basis.

And/or characteristically, a PDCCH candidate to which such a rate-matching operation will be applied may have been enabled and/or disabled only if it is scheduled as a specific RNTI that has been pre-defined, agreed and/or configured, belongs to a specific search space set that has been pre-defined, agreed and/or configured, has a specific numerology, has a specific TTI length and/or duration, or is indicated as a specific processing time and/or if specific CRC masking has been used. This may include a case where the PDCCH candidate has been associated with a specific service type (e.g., URLLC) or a specific reliability and/or latency requirement.

And/or a flexible symbol window may be configured with a search space set. For example, if a CORESET having a length of 2 (CORESET duration=2) is mapped to a search space set and the monitoring occasion of the corresponding search space set is configured within a slot as {0, 4, 8, 10}

(SS set monitoring in an OFDM symbol 0, 4, 8, 10), a corresponding candidate may be skipped if overlap with a PDSCH, a rate matching resource or a CSI-RS occurs with respect to one occasion.

In order to prevent this, if overlaps occurs with respect to the highest AL candidate (or candidates of a set of ALs), a search space set monitoring occasion may be shifted by the number of OFDM symbols within a flexible symbol window.

For example, assuming that a flexible symbol window is 2 OFDM symbols, this may mean that search space monitoring is shifted if overlap can be avoided by shifting the search space monitoring within 2 symbols (i.e., OFDM symbol 5 or 6) when an SS set monitoring occasion starting at an OFDM symbol 4 overlaps a rate-matching resource (RMR) or a CSI-RS.

If another rate matching resource occurs although a shift is performed, it may be assumed that the first monitoring occasion is maintained. It may be assumed that such information is determined by only semi-static information so that a base station (or network) and a UE have the same information. If candidates are multiple when a corresponding method is used, a shift operation may be assumed only if all candidates for a specific AL (or AL set) are skipped. In a similar method, it may be assumed that a search space is configured with a shorter period and a monitoring skip is performed on all search spaces that are not monitored because a candidate of a specific AL or AL set is skipped.

If corresponding monitoring is skipped, it may be assumed that BD and/or a channel estimation budget is not allocated to a corresponding occasion. In general, if an AL (or AL set) to be protected for each search space set is configured and all candidates for the corresponding AL are skipped, the entire corresponding search space set may be skipped in a corresponding occasion.

And/or when a corresponding method is used, a method of calculating the number of CCEs within a CORESET may be as follows.

The number of CCEs may be measured based on the number of RBs and the number of REGs according to a CORESET configuration regardless of a rate matching resource or a collision with an SSB. When a corresponding method is used, actually available resources may be smaller than the number of CCEs if a rate matching resource or an REG actually not used due to a collision with an SSB is skipped. A corresponding operation may be an operation different from that performed by a UE with respect to another AL (i.e., candidate skip, in this case, the candidate overlaps rate-matching and/or SSB fully or partially).

And/or all CCEs may be calculated except a rate matching resource, an REG or a CCE that collides against an SSB. When rate-matching is performed on a CSI-RS, corresponding overlap may not be considered.

And/or if a service type and/or service requirements are determined by a search space, higher priority may be assigned to a search space set associated with lower latency and/or higher reliability. A rule for preferentially performing blind decoding on a candidate belonging to a corresponding search space set may be defined, agreed and/or configured.

And/or if a service type and/or service requirements are determined by an RNTI, an RNTI that needs to be monitored for each search space may be pre-defined and/or configured, and higher priority may be assigned to a search space to which an RNTI associated with lower latency and/or higher reliability belongs. A rule for preferentially performing blind decoding on a candidate belonging to a corresponding search space set may be defined, agreed and/or configured.

Second Embodiment

Next, a method of reporting a UE capability related to a blind decoding operation is described specifically.

Particularly, the second embodiment is divided into a method of reporting a UE capability related to blind decoding (hereinafter method 1), a method of separately defining a UE capability based on a service type (hereinafter method 2), a method of defining a UE capability as a different value based on a UE capability related to a PDSCH processing time (hereinafter method 3), a method of defining a UE capability as a different value based on the characteristics of a downlink/uplink data channel (hereinafter method 4), and a method of defining a transmission timing gap as a different value based on a UE capability related to blind decoding (hereinafter method 5) and is described.

The following methods have been divided for convenience of description, and the configuration of any method may be substituted with the configuration of another method or they may be mutually combined and applied.

(Method 1)

First, a method of reporting a UE capability related to blind decoding is described.

If traffic that needs to satisfy a URLLC service or lower latency requirement has to be processed, more frequent scheduling may need to be performed using a channel having shorter duration. In this case, a monitoring occasion within a slot may need to be split in pieces. In such a situation, a blind decoding (BD) limit of a UE that has now been defined may be insufficient, and a capability capable of performing a larger number of blind decodings in order to support the service and/or requirement may be defined, agreed and/or configured as a UE capability. In the disclosure, a monitoring occasion may be referred to as a monitoring span or monitoring duration.

Characteristically, a rule on which a UE reports a maximum number of PDCCH candidates that may be monitored within one monitoring occasion may be defined, agreed and/or configured. Such a capability may be separately defined and reported for each number of monitoring occasions within a slot (and/or group) if a set of the number of monitoring occasions within the slot is fixed. In general, information for a maximum number of PDCCH candidates which may be monitored for given time duration, a maximum number of corresponding time durations within a slot and/or a minimum gap between time durations may be reported as a UE capability.

And/or information for a maximum number of PDCCH candidates which may be monitored by a UE within one monitoring occasion may be reported as a UE capability for each maximum number of monitoring occasions within a slot, each minimum gap between monitoring occasions and/or each numerology.

And/or information for a maximum number of CCEs which may be channel-estimated (CE) for given time duration (e.g., monitoring occasion), a maximum number of corresponding time durations within a slot and/or a minimum gap between time durations may be reported as a UE capability. In the disclosure, the number of CCEs may mean the number of non-overlapping CCEs.

And/or information for a maximum number of monitoring occasions within a slot, the length of a monitoring occasion, a gap (e.g., minimum gap) between monitoring occasions and/or a maximum number of CCEs which may be channel-estimated by a UE for each numerology may be reported as a UE capability. In other words, information for a maximum number of non-overlapping CCEs which may be channel-estimated per monitoring occasion may be reported as a UE capability for each at least one of the length of a monitoring occasion, a gap between monitoring occasions and/or a numerology.

And/or a maximum number of BDs and/or CEs supportable in one monitoring occasion is the same as a number that has been current defined in eMBB (e.g., 44/56 in 15 kHz). A rule for determining a maximum number of BDs and/or CEs which may be supported by a UE within a specific timing gap (e.g., 1 ms) based on the maximum number of supportable BDs and/or CEs may be defined, agreed and/or configured (e.g., 8 times the corresponding number).

As a characteristic example, if a maximum number of monitoring occasions within a slot is 7 (if a minimum gap is 2 symbols), a BD limit may be 20 and a CE limit may be 40 (BD limit=20, CE limit=40), whereas a maximum number of monitoring occasions within a slot is 2 (if a minimum gap is 7 symbols), a BD limit may be 44 and a CE limit may be 56 (BD limit=44, CE limit=56). That is, a rule on which a BD and/or a CE limit tends to decrease as a minimum gap between monitoring occasions is reduced may be defined and/or configured.

A base station may configure a monitoring occasion using the information so that a corresponding UE capability is not exceeded. A rule on which a UE skips monitoring for a monitoring occasion, a candidate and/or an AL (and/or set) having low priority based on pre-defined priority if a corresponding UE capability is exceeded (or the UE does not expect a configuration exceeding its own capability) may be defined, agreed and/or configured.

(Method 2)

Next, a method of separately defining a UE capability related to blind decoding based on a service type is described.

If a capability is defined (e.g., information for a maximum number of PDCCH candidates which may be monitored for given duration, a maximum number of non-overlapping CCEs, a maximum number of corresponding time durations within a slot, a minimum gap between time durations and/or a duration length is defined as a UE capability) as described above, the corresponding capability may be separately defined, agreed and/or configured for each target service (e.g., URLLC), quality of service (QoS), BLER requirement, reliability requirement, latency requirement and/or processing time.

And/or the corresponding capability may be separately defined, agreed and/or configured for each search space (type), RNTI, CORESET, DCI format (group), DCI size and/or aggregation level (AL). For example, with respect to search spaces (and/or types) which may be classified into a plurality of groups, a separate PDCCH monitoring capability may be defined, agreed and/or configured for each group.

And/or if a maximum number of PDCCH candidates which may be monitored per slot and/or a maximum number of non-overlapping CCEs is defined as X and the number of durations within a slot is {Y1, Y2, . . . , Yn}, X may be defined, agreed and/or configured as a minimum common multiple of {Y1, Y2, . . . , Yn}. Furthermore, if the number of durations within a slot is Yk, X/Yk may be defined, agreed and/or configured as a maximum number of PDCCH candidates which may be monitored in corresponding time duration and/or a maximum number of non-overlapping control channel elements (CCEs).

In general, if a maximum number of PDCCH candidates which may be monitored per slot and/or a maximum number of non-overlapping CCEs is defined X and the number of durations within a slot is {Y1, Y2, . . . , Yn}, a maximum number of PDCCH candidates which may be monitored in corresponding time duration and/or a maximum number of non-overlapping CCEs for the number Yk of specific durations within a slot may be defined, agreed and/or configured as the greatest integer (i.e., floor{X/Yk}) smaller than X/Yk.

A base station may configure a monitoring occasion, the number of candidates, a CORESET and/or a search space using the information so that a corresponding UE capability is not exceeded. A rule on which a UE skips monitoring for a monitoring occasion, a candidate, an AL and/or a search space (and/or set) having low priority based on pre-defined priority (or the UE does not expect a configuration exceeding its own capability) if the corresponding UE capability is exceeded may be defined, agreed and/or configured.

(Method 3)

Next, a method of differently defining a UE capability related to blind decoding as a different value based on a UE capability related to a PDSCH processing time is described.

And/or after PDCCH decoding is terminated, a UE performs a necessary operation among PDSCH decoding, HARQ-ACK encoding, and PUSCH encoding based on the PDCCH decoding. If a maximum number of PDCCH candidates to be monitored by a UE within a specific time and/or a maximum number of non-overlapping CCEs is increased, a time margin necessary for operations that need to be subsequently performed may be reduced due to PDCCH monitoring.

Accordingly, if a capability is defined (e.g., information for a maximum number of PDCCH candidates which may be monitored for given duration, a maximum number of non-overlapping control channel elements (CCEs), a maximum number of corresponding time durations within a slot, a minimum gap between time durations and/or a duration length is defined as a UE capability) as described above, the corresponding capability may be defined, agreed and/or configured (independently) as a different value based on a UE capability (e.g., a UE PDSCH processing procedure time and/or a UE PUSCH preparation procedure time) for a scheduling timing gap (PDCCH-to-PDSCH timing gap, PDCCH-to-PUSCH timing gap and/or a PDSCH-to-PUCCH timing gap) and/or a configuration of a base station for a scheduling timing gap. In this case, the PDCCH-to-PDSCH timing gap may mean a timing gap (e.g., k0) from the reception timing of a PDCCH to the reception timing of a PDSCH scheduled by the corresponding PDCCH. For example, the PDSCH-to-PUCCH timing gap may mean a timing gap (e.g., k1) from the reception timing of a PDSCH to the transmission timing of a PUCCH including HARQ-ACK information for the corresponding PDSCH.

For example, if values of a UE capability for a PDSCH-to-PUCCH timing gap are defined 8 symbols and 3 symbols, respectively, values of a UE capability for a maximum number of PDCCH candidates which may be monitored within a slot for specific duration and/or a maximum number of non-overlapping CCEs may be defined, agreed and/or configured as X and Y (e.g., X>Y), respectively.

And/or a UE capability (e.g., UE PDSCH processing procedure time and/or UE PUSCH preparation procedure time) for a PDCCH-to-PUSCH timing gap and/or a PDSCH-to-PUCCH timing gap and/or the configuration (e.g., minimum value of scheduling timing gap) of a base station for the scheduling timing gap may be defined, agreed and/or configured (independently) as a different value based on a PDCCH monitoring capability (e.g., a maximum number of PDCCH candidates which may be monitored within a slot for specific duration and/or a maximum number of non-overlapping CCEs).

For example, if 44 PDCCH candidates need to be monitored in one slot and 44 times of monitoring need to be performed in one half slot (i.e., duration corresponding to half of a slot), values of a UE capability for a PDSCH-to-PUCCH timing gap may be defined, agreed and/or configured as X symbols and Y symbols (e.g., X<Y or Y=X+alpha and alpha>0), respectively.

For another example, if 44 PDCCH candidates need to be monitored in one slot and 44 PDCCH candidates need to be monitored per monitoring occasion when a minimum gap between two consecutive PDCCH transmissions within a slot is 2 symbols, values of a UE capability for a PDSCH-to-PUCCH timing gap may be defined, agreed and/or configured as X symbols and Y symbols (e.g., X<Y or Y=X+alpha and alpha>0), respectively.

And/or if a UE capability (e.g., UE PDSCH processing procedure time and/or UE PUSCH preparation procedure time) for a PDCCH-to-PUSCH timing gap and/or a PDSCH-to-PUCCH timing gap is a specific value or less, a PDCCH monitoring capability (e.g., a maximum number of PDCCH candidates which may be monitored within a slot for specific duration and/or a maximum number of non-overlapping CCEs) may not be applied, and a maximum number of PDCCH candidates which may be monitored during the existing slot and/or a maximum number of non-overlapping CCEs may be applied.

And/or if a PDCCH monitoring capability (e.g., a maximum number of PDCCH candidates which may be monitored within a slot for specific duration, a maximum number of non-overlapping CCEs, a maximum number of corresponding time durations within a slot, a minimum gap between time durations and/or a duration length) is a given level or more, a UE capability (e.g., UE PDSCH processing procedure time and/or UE PUSCH preparation procedure time) for a PDCCH-to-PUSCH timing gap and/or a PDSCH-to-PUCCH timing gap may be applied as a processing capability 1.

A base station may configure the number of monitoring occasions and candidates, a CORESET and/or a search space using the information so that a corresponding UE capability is not exceed. A rule on which a UE skips monitoring for a monitoring occasion, a candidate, an AL and/or a search space (set) having low priority based on pre-defined priority (or the UE does not expect a configuration exceeding its own capability) if the corresponding UE capability is exceed may be defined, agreed and/or configured.

(Method 4)

Next, a method of defining a UE capability related to blind decoding as a different value based on the characteristics of a downlink/uplink data channel is described.

If a capability (e.g., information for a maximum number of PDCCH candidates which may be monitored for given duration, a maximum number of non-overlapping control channel elements (CCEs), a maximum number of corresponding time durations within a slot, a minimum gap between time durations and/or a duration length is defined as a UE capability) is defined as described above, the corresponding capability may be defined, agreed and/or configured (independently) as a different value based on the transport block size of a downlink and/or uplink data channel (DL/UL data channel), the number of layers and/or the number of RBs.

And/or the upper and lower limits of the transport block size of a downlink and/or uplink data channel, the number of layers and/or the number of RBs may be defined, agreed and/or configured (independently) as a different value based on a PDCCH monitoring capability (e.g., a maximum number of PDCCH candidates which may be monitored within a slot for specific duration, a maximum number of non-overlapping CCEs, a maximum number of corresponding time durations within a slot, a minimum gap between time durations and/or a duration length).

And/or if the transport block size, number of layers, and number of RBs of a downlink and/or uplink data channel is a specific value or more, a PDCCH monitoring capability (e.g., a maximum number of PDCCH candidates which may be monitored within a slot for specific duration, a maximum number of non-overlapping CCEs, a maximum number of corresponding time durations within a slot, a minimum gap between time durations and/or a duration length) may not be applied, and a maximum number of PDCCH candidates which may be monitored during the existing slot and/or a maximum number of non-overlapping CCEs may be applied.

A base station may configure the number of monitoring occasions and candidates, a CORESET and/or a search space using the information so that a corresponding UE capability is not exceeded. A rule on which a UE skips monitoring for a monitoring occasion, a candidate, an AL and/or a search space (set) having low priority based on pre-defined priority (or the UE does not expect a configuration exceeding its own capability) if the corresponding UE capability is exceeded may be defined, agreed and/or configured.

And/or characteristically, a restriction on the transport block size of a downlink and/or uplink data channel, the number of layers and/or the number of RBs may be defined and/or applied to only a specific monitoring occasion, span and/or time duration.

And/or a restriction on the transport block size of a downlink and/or uplink data channel, the number of layers and/or the number of RBs may be independently (differently) defined and/or applied for each monitoring occasion, span and/or time duration.

This is for also defining a scheduling restriction in a monitoring occasion, span and/or time duration in which a maximum number of PDCCH candidates and/or a maximum number of non-overlapping CCEs having a greater value has been defined by considering a situation in which a maximum number of PDCCH candidates and/or a maximum number of non-overlapping CCEs having different values may be defined for each monitoring occasion, span and/or time duration within a slot so that a degree of the processing complication of a UE can be prevented from being excessively increased.

For example, a maximum number of PDCCH candidates and/or a maximum number of non-overlapping CCEs in the first monitoring occasion and/or span within a slot may be defined to have a greater value than that in the remaining monitoring occasions and/or spans. A restriction on the upper limit of the transport block size of a downlink and/or uplink data channel, the number of layers and/or RBs may be defined for only the first monitoring occasion and/or span. In this case, a UE may expect that a downlink and/or uplink data channel corresponding to a transport block size, the number of layers and/or the number of RBs not exceeding the restriction is scheduled in the first monitoring occasion and/or span.

For another example, the upper limit of the transport block size of a downlink and/or uplink data channel, the number of layers and/or the number of RBs having different values may be defined between the first monitoring occasion and/or span and the remaining monitoring occasions and/or spans. In this case, a UE may expect that a downlink and/or uplink data channel not exceeding the upper limit of each defined transport block size, number of layers and/or number of RBs is scheduled in each monitoring occasion and/or span.

(Method 5)

Next, a method of defining a transmission timing gap as a different value based on a UE capability related to blind decoding is described.

A value (e.g., minimum value of a scheduling timing gap) of a PDCCH-to-PDSCH timing gap which may be set and/or indicated by a base station may be defined (independently) as a different value (and/or may be reported to the base station as a UE capability) based on a PDCCH monitoring capability (e.g., a maximum number of PDCCH candidates which may be monitored within a slot for specific duration and/or a maximum number of non-overlapping CCEs).

For example, if 44 PDCCH candidates need to be monitored in one slot, the first symbol of a PDSCH is scheduled so that it is not placed ahead of the last symbol of a PDCCH only. In contrast, if 44 times of monitoring need to be performed in one half slot (i.e., duration corresponding to half of a slot), a rule on which a PDSCH can be started from a given time since the last symbol of a PDCCH may be defined, agreed and/or configured. Even in this case, after PDCCH decoding is terminated, a necessary operation among PDSCH decoding, HARQ-ACK encoding, and PUSCH encoding is subsequently performed based on the PDCCH decoding. In this case, a case where a time margin necessary for operations to be subsequently performed may be reduced due to PDCCH monitoring if a maximum number of PDCCH candidates to be monitored by a UE within a specific time and/or a maximum number of non-overlapping CCEs is increased may have been considered.

A base station may configure a monitoring occasion, the number of candidates, a CORESET and/or a search space based on the rule and/or information obtained from a UE so that a corresponding UE capability is not exceeded. The UE may determine a PDCCH-to-PDSCH timing gap to a limit that may be processed by the UE. A rule on which a UE skips monitoring for a monitoring occasion, candidate, AL and/or a search space (set) having low priority based on pre-defined priority (or the UE does not expect a configuration and/or scheduling exceeding its own capability) if the UE capability is exceeded may be defined, agreed and/or configured.

In the disclosure, a target service (e.g., URLLC), QoS, a BLER requirement, a reliability requirement, a latency requirement and/or a processing time for a specific channel may be configured through a high layer signal, may be explicitly indicated through a specific field of DCI, may be classified through a search space to which a PDCCH (scheduling downlink and/or uplink data (DL/UL data)) belongs, may be classified through a control resource set (CORESET) to which a PDCCH (scheduling downlink and/or uplink data) belongs, may be classified through an RNTI, may be classified through a DCI format and/or may be classified through the CRC masking of a PDCCH.

The proposals of the disclosure may also be applied to the handling of a plurality of types of channels classified into a specific field of DCI, a search space to which a PDCCH belongs, a CORESET to which a PDCCH belongs, an RNTI, a DCI format and/or the CRC masking of the PDCCH without explicit distinction for a target service, QoS, a BLER requirement, a reliability requirement, a latency requirement and/or a processing time for a channel. In the proposals of the disclosure, a "channel corresponding to a specific target service, QoS, BLER requirement, reliability requirement, latency requirement and/or processing time" may be substituted and applied as a "specific channel classified as the CRC masking of a specific field, a search space to which a PDCCH belongs, a CORESET to which a PDCCH belongs, an RNTI, a DCI format and/or a PDCCH among a plurality of types of channels."

It is evident that examples of the above-described proposed methods may also be considered as a kind of proposed methods because they can be included as implementation methods of the disclosure. Furthermore, the above-described proposed methods may be independently implemented, but may be implemented in the form of a combination (or merge) of some of the proposed methods. A rule on which a base station notifies a UE of information whether to apply the proposed methods (or information for the rules of the proposed methods) through a pre-defined signal (e.g., a physical layer signal or a higher layer signal) may be defined, agreed and/or configured.

Figure 10:
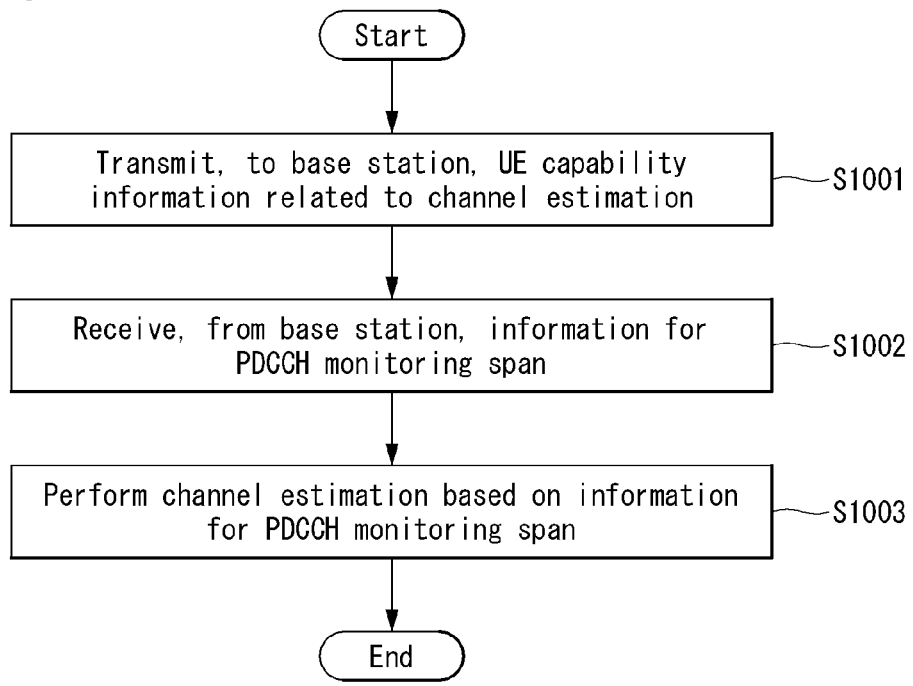
FIG. 10 is a flowchart for describing an operation method of a UE proposed in the disclosure.

FIG. 10 is a flowchart for describing an operation method of a UE proposed in the disclosure.

Referring to FIG. 10, first, a UE may transmit, to a base station, UE capability information related to a channel estimation (S1001).

The UE capability information may include information for a maximum number of control channel elements (CCEs) capable of being channel-estimated per PDCCH monitoring span. In the disclosure, the PDCCH monitoring span may be referred to as a PDCCH monitoring span or a PDCCH monitoring occasion.

One CCE may include a plurality of resource element groups (REGs). An REG may be configured with one symbol and 12 resource elements.

Next, the UE may receive, from the base station, information for the PDCCH monitoring span (S1002).

The information for the PDCCH monitoring span may include information for a search space set and/or information for a control channel set (control resource set (CORESET)). The UE may determine a PDCCH monitoring span based on the information for a search space set and/or the information for a control channel set.

The base station may receive UE the capability information from the UE, and may transmit and/or configure the information for the PDCCH monitoring span based on the UE capability information so that the UE capability is not exceeded.

Next, the UE may perform a channel estimation based on the information for the PDCCH monitoring span (S1003). The UE may perform a channel estimation on a CCE within the monitoring span.

If the number of CCEs exceeds the UE capability within the PDCCH monitoring span upon channel estimation, the UE may perform a channel estimation by giving priority to a PDCCH monitoring span and/or CCE having high priority based on pre-defined and/or pre-configured priority, and may skip a PDCCH monitoring span and/or CCE having low priority.

In this case, if the number of CCEs within the PDCCH monitoring span exceeds a maximum number of CCEs capable of being supported by the UE, the base station may expect that a channel estimation is performed by giving priority to a PDCCH monitoring span and/or CCE having high priority and a PDCCH monitoring span and/or CCE having low priority is skipped.

The information for a maximum number of CCEs may be determined based on at least one of the length of a PDCCH monitoring span, an interval between PDCCH monitoring spans and/or a numerology. For example, the information for a maximum number of CCEs may include a maximum number of CCEs capable of being channel-estimated by a UE in one PDCCH monitoring span for each at least one of the length of a PDCCH monitoring span, an interval between PDCCH monitoring spans and/or a numerology.

The maximum number of CCEs may be the number of non-overlap CCEs.

And/or the information for a maximum number of CCEs may be determined based on at least one of a service type, quality of service (QoS), a service requirement and/or a processing time. For example, the information for a maximum number of CCEs may include a maximum number of CCEs capable of being channel-estimated by a UE in one PDCCH monitoring span for each at least one of a service type, quality of service, service requirements and/or a processing time. For example, the service type may mean whether it is for eMBB data or URLLC data transmission and reception. The service requirements may mean a BLER requirement, a reliability requirement and/or a latency requirement. The processing time may mean a physical downlink shared channel (PDSCH) processing time, a channel state information (CSI) calculation time and/or a physical uplink shared channel (PUSCH) preparation time.

And/or the information for a maximum number of CCEs may be determined based on at least one of the PDSCH processing time and/or PUSCH preparation time of the UE. For example, the information for a maximum number of CCEs may include a maximum number of CCEs capable of being channel-estimated by the UE in one PDCCH monitoring span for each at least one of a PDSCH processing time and/or a PUSCH preparation time.

And/or the information for a maximum number of CCEs may be determined based on at least one of at least one transport block size, the number of layers and/or the number of RBs among a PDSCH and/or a PUSCH. For example, the information for a maximum number of CCEs may include a maximum number of CCEs capable of being channel-estimated by the UE in one PDCCH monitoring span by the transport block size of a PDSCH.

And/or a timing gap (e.g., K0) from a PDCCH to a PDSCH may be configured by a base station based on the information for a maximum number of CCEs. For example, as a maximum number of CCEs increases, a set timing gap from a PDCCH to a PDSCH may be increased. And/or a timing gap (e.g., K2) from a PDCCH to a PUSCH may be configured by a base station based on the information for a maximum number of CCEs. And/or a timing gap (e.g., K0) from a PDCCH to HARQ-ACK information transmission may be configured by a base station based on the information for a maximum number of CCEs.

The operation method of a UE described with reference to FIG. 10 is the same as the operation method of the UE described with reference to FIGS. 1 to 9, and other detailed description thereof is omitted.

Figure 12:
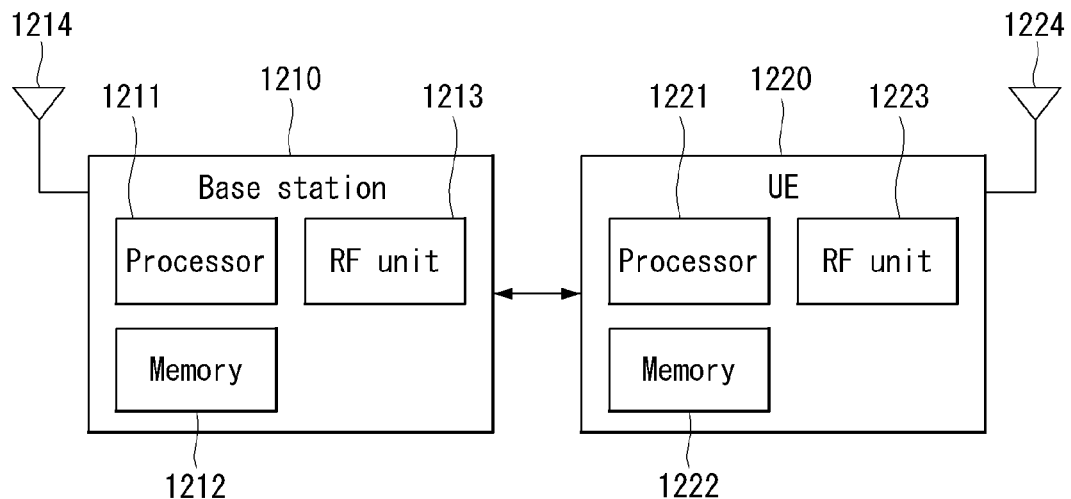
FIG. 12 illustrates a block configuration diagram of a wireless communication apparatus to which methods proposed in the disclosure are applicable.

In relation to this, the above operation of the UE may be specifically implemented by a UE apparatus 1220 illustrated in FIG. 12 of the disclosure. For example, the above operation of the UE may be performed a processor 1221 and/or an RF unit 1223.

Referring to FIG. 12, first, a processor 1221 may transmit, to a base station, UE capability information related to a channel estimation through the RF unit 1223 (S1001).

The UE capability information may include information for a maximum number of control channel elements (CCEs) capable of being channel-estimated per PDCCH monitoring span. In the disclosure, the PDCCH monitoring span may be referred to as a PDCCH monitoring span or a PDCCH monitoring occasion.

One CCE may include a plurality of resource element groups (REGs). An REG may be configured with one symbol and 12 resource elements.

Next, the processor 1221 may receive, from the base station, information for a PDCCH monitoring span through the RF unit 1223 (S1002).

The information for the PDCCH monitoring span may include information for a search space set and/or information for a control channel set (control resource set (CORESET)). The UE may determine the PDCCH monitoring span based on the information for a search space set and/or the information for a control channel set.

The base station may receive the UE capability information from the UE, and may transmit and/or configure the information for the PDCCH monitoring span based on the UE capability information so that a UE capability is not exceeded.

Next, the processor 1221 may perform a channel estimation based on the information for the PDCCH monitoring span through the RF unit 1223 (S1003). The UE may perform a channel estimation on a CCE within the monitoring span.

If the number of CCEs within the PDCCH monitoring span exceeds the UE capability upon channel estimation, the UE may perform a channel estimation by giving priority to a PDCCH monitoring span and/or CCE having high priority based on pre-defined and/or pre-configured priority, and may skip a PDCCH monitoring span and/or CCE having low priority.

In this case, if the number of CCEs within the PDCCH monitoring span exceeds a maximum number of CCEs capable of being supported by the UE, the base station may expect that a channel estimation is performed by giving priority to a PDCCH monitoring span and/or CCE having high priority and a PDCCH monitoring span and/or CCE having low priority is skipped.

The information for a maximum number of CCEs may be determined based on at least one of the length of a PDCCH monitoring span, an interval between PDCCH monitoring spans and/or a numerology. For example, the information for a maximum number of CCEs may include a maximum number of CCEs capable of being channel-estimated by the UE in one PDCCH monitoring span by at least one of the length of a PDCCH monitoring span, an interval between PDCCH monitoring spans and/or a numerology.

The maximum number of CCEs may be the number of non-overlap CCEs.

And/or the information for a maximum number of CCEs may be determined based on at least one of a service type, quality of service (QoS), a service requirement and/or a processing time. For example, the information for a maximum number of CCEs may include a maximum number of CCEs capable of being channel-estimated by a UE in one PDCCH monitoring span for each at least one of a service type, quality of service, service requirements and/or a processing time. For example, the service type may mean whether it is for eMBB data or URLLC data transmission and reception. The service requirements may mean a BLER requirement, a reliability requirement and/or a latency requirement. The processing time may mean a physical downlink shared channel (PDSCH) processing time, a channel state information (CSI) calculation time and/or a physical uplink shared channel (PUSCH) preparation time.

And/or the information for a maximum number of CCEs may be determined based on at least one of the PDSCH processing time and/or PUSCH preparation time of the UE. For example, the information for a maximum number of CCEs may include a maximum number of CCEs capable of being channel-estimated by the UE in one PDCCH monitoring span for each at least one of a PDSCH processing time and/or a PUSCH preparation time.

And/or the information for a maximum number of CCEs may be determined based on at least one of at least one transport block size, the number of layers and/or the number of RBs among a PDSCH and/or a PUSCH. For example, the information for a maximum number of CCEs may include a maximum number of CCEs capable of being channel-estimated by the UE in one PDCCH monitoring span by the transport block size of a PDSCH.

And/or a timing gap (e.g., K0) from a PDCCH to a PDSCH may be configured by a base station based on the information for a maximum number of CCEs. For example, as a maximum number of CCEs increases, a set timing gap from a PDCCH to a PDSCH may be increased. And/or a timing gap (e.g., K2) from a PDCCH to a PUSCH may be configured by a base station based on the information for a maximum number of CCEs. And/or a timing gap (e.g., K0) from a PDCCH to HARQ-ACK information transmission may be configured by a base station based on the information for a maximum number of CCEs.

The operation of the UE described with reference to FIG. 12 is the same as the operation of the UE described with reference to FIGS. 1 to 10, and other detailed description thereof is omitted.

Figure 11:
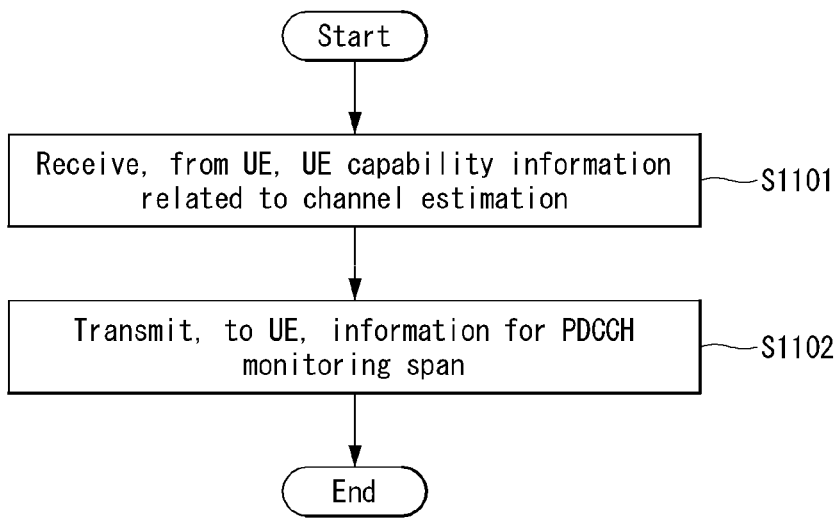
FIG. 11 is a flowchart for describing an operation method of a base station proposed in the disclosure.

FIG. 11 is a flowchart for describing an operation method of a base station proposed in the disclosure.

Referring to FIG. 11, first, the base station may receive, from a UE, UE capability information related to a channel estimation (S1101).

The UE capability information may include information for a maximum number of control channel elements (CCEs) capable of being channel-estimated per PDCCH monitoring span. In the disclosure, the PDCCH monitoring span may be referred to as a PDCCH monitoring span or a PDCCH monitoring occasion.

One CCE may include a plurality of resource element groups (REGs). An REG may be configured with one symbol and 12 resource elements.

Next, the base station may transmit, to the UE, information for a PDCCH monitoring span (S1102).

The information for the PDCCH monitoring span may include information for a search space set and/or information for a control channel set (control resource set (CORESET)). The UE may determine the PDCCH monitoring span based on the information for a search space set and/or the information for a control channel set.

The base station may receive the UE capability information from the UE, and may transmit and/or configure the information for the PDCCH monitoring span based on the UE capability information so that a UE capability is not exceeded. The UE may perform a channel estimation on a CCE within the monitoring span.

If the number of CCEs within the PDCCH monitoring span exceeds the UE capability upon channel estimation, the UE may perform a channel estimation by giving priority to a PDCCH monitoring span and/or CCE having high priority based on pre-defined and/or pre-configured priority, and may skip a PDCCH monitoring span and/or CCE having low priority.

In this case, if the number of CCEs within the PDCCH monitoring span exceeds a maximum number of CCEs capable of being supported by the UE, the base station may expect that a channel estimation is performed by giving priority to a PDCCH monitoring span and/or CCE having high priority and a PDCCH monitoring span and/or CCE having low priority is skipped.

The information for a maximum number of CCEs may be determined based on at least one of the length of a PDCCH monitoring span, an interval between PDCCH monitoring spans and/or a numerology. For example, the information for a maximum number of CCEs may include a maximum number of CCEs capable of being channel-estimated by the UE in one PDCCH monitoring span by at least one of the length of a PDCCH monitoring span, an interval between PDCCH monitoring spans and/or a numerology.

The maximum number of CCEs may be the number of non-overlap CCEs.

And/or the information for a maximum number of CCEs may be determined based on at least one of a service type, quality of service (QoS), a service requirement and/or a processing time. For example, the information for a maximum number of CCEs may include a maximum number of CCEs capable of being channel-estimated by a UE in one PDCCH monitoring span for each at least one of a service type, quality of service, service requirements and/or a processing time. For example, the service type may mean whether it is for eMBB data or URLLC data transmission and reception. The service requirements may mean a BLER requirement, a reliability requirement and/or a latency requirement. The processing time may mean a physical downlink shared channel (PDSCH) processing time, a channel state information (CSI) calculation time and/or a physical uplink shared channel (PUSCH) preparation time.

And/or the information for a maximum number of CCEs may be determined based on at least one of the PDSCH processing time and/or PUSCH preparation time of the UE. For example, the information for a maximum number of CCEs may include a maximum number of CCEs capable of being channel-estimated by the UE in one PDCCH monitoring span for each at least one of a PDSCH processing time and/or a PUSCH preparation time.

And/or the information for a maximum number of CCEs may be determined based on at least one of at least one transport block size, the number of layers and/or the number of RBs among a PDSCH and/or a PUSCH. For example, the information for a maximum number of CCEs may include a maximum number of CCEs capable of being channel-estimated by the UE in one PDCCH monitoring span by the transport block size of a PDSCH.

And/or a timing gap (e.g., K0) from a PDCCH to a PDSCH may be configured by a base station based on the information for a maximum number of CCEs. For example, as a maximum number of CCEs increases, a set timing gap from a PDCCH to a PDSCH may be increased. And/or a timing gap (e.g., K2) from a PDCCH to a PUSCH may be configured by a base station based on the information for a maximum number of CCEs. And/or a timing gap (e.g., K0) from a PDCCH to HARQ-ACK information transmission may be configured by a base station based on the information for a maximum number of CCEs.

The operation method of the base station described with reference to FIG. 11 is the same as the operation method of the base station described with reference to FIGS. 1 to 9, and other detailed description thereof is omitted.

In relation to this, the operation of the base station may be specifically implemented by a base station apparatus 1210 illustrated in FIG. 12 of the disclosure. For example, the operation of the base station may be performed by a processor 1211 and/or an RF unit 1213.

Referring to FIG. 12, first, the processor 1211 may receive, from a UE, UE capability information related to a channel estimation through the RF unit 1213 (S1101).

The UE capability information may include information for a maximum number of control channel elements (CCEs) capable of being channel-estimated per PDCCH monitoring span. In the disclosure, the PDCCH monitoring span may be referred to as a PDCCH monitoring span or a PDCCH monitoring occasion.

One CCE may include a plurality of resource element groups (REGs). An REG may be configured with one symbol and 12 resource elements.

Next, the processor 1211 may transmit, to the UE, information fora PDCCH monitoring span through the RF unit 1213 (S1102).

The information for the PDCCH monitoring span may include information for a search space set and/or information for a control channel set (control resource set (CORE-SET)). The UE may determine the PDCCH monitoring span based on the information for a search space set and/or the information for a control channel set.

The base station may receive the UE capability information from the UE, and may transmit and/or configure the information for the PDCCH monitoring span based on the UE capability information so that a UE capability is not exceeded. The UE may perform a channel estimation on a CCE within the monitoring span.

If the number of CCEs within the PDCCH monitoring span exceeds the UE capability upon channel estimation, the UE may perform a channel estimation by giving priority to a PDCCH monitoring span and/or CCE having high priority based on pre-defined and/or pre-configured priority, and may skip a PDCCH monitoring span and/or CCE having low priority.

In this case, if the number of CCEs within the PDCCH monitoring span exceeds a maximum number of CCEs capable of being supported by the UE, the base station may expect that a channel estimation is performed by giving priority to a PDCCH monitoring span and/or CCE having high priority and a PDCCH monitoring span and/or CCE having low priority is skipped.

The information for a maximum number of CCEs may be determined based on at least one of the length of a PDCCH monitoring span, an interval between PDCCH monitoring spans and/or a numerology. For example, the information for a maximum number of CCEs may include a maximum number of CCEs capable of being channel-estimated by the UE in one PDCCH monitoring span by at least one of the length of a PDCCH monitoring span, an interval between PDCCH monitoring spans and/or a numerology.

The maximum number of CCEs may be the number of non-overlap CCEs.

And/or the information fora maximum number of CCEs may be determined based on at least one of a service type, quality of service (QoS), a service requirement and/or a processing time. For example, the information for a maximum number of CCEs may include a maximum number of CCEs capable of being channel-estimated by a UE in one PDCCH monitoring span for each at least one of a service type, quality of service, service requirements and/or a processing time. For example, the service type may mean whether it is for eMBB data or URLLC data transmission and reception. The service requirements may mean a BLER requirement, a reliability requirement and/or a latency requirement. The processing time may mean a physical downlink shared channel (PDSCH) processing time, a channel state information (CSI) calculation time and/or a physical uplink shared channel (PUSCH) preparation time.

And/or the information for a maximum number of CCEs may be determined based on at least one of the PDSCH processing time and/or PUSCH preparation time of the UE. For example, the information for a maximum number of CCEs may include a maximum number of CCEs capable of being channel-estimated by the UE in one PDCCH monitoring span for each at least one of a PDSCH processing time and/or a PUSCH preparation time.

And/or the information for a maximum number of CCEs may be determined based on at least one of at least one transport block size, the number of layers and/or the number of RBs among a PDSCH and/or a PUSCH. For example, the information for a maximum number of CCEs may include a maximum number of CCEs capable of being channel-estimated by the UE in one PDCCH monitoring span by the transport block size of a PDSCH.

And/or a timing gap (e.g., K0) from a PDCCH to a PDSCH may be configured by a base station based on the information for a maximum number of CCEs. For example, as a maximum number of CCEs increases, a set timing gap from a PDCCH to a PDSCH may be increased. And/or a timing gap (e.g., K2) from a PDCCH to a PUSCH may be configured by a base station based on the information for a maximum number of CCEs. And/or a timing gap (e.g., K0) from a PDCCH to HARQ-ACK information transmission may be configured by a base station based on the information for a maximum number of CCEs.

The operation of the base station illustrated in FIG. 12 is the same as the operation of the base station described with reference to FIGS. 1 to 11, and other detailed description thereof is omitted.

Overview of Device to which the Disclosure may be Applied

FIG. 12 illustrates an example of an internal block diagram of a wireless communication apparatus to which the disclosure may be applied.

Referring to FIG. 12, a wireless communication system includes the base station 1210 and a plurality of the UEs 1220 disposed within the area of the base station 1210. Hereinafter, the base station 1210 and the UE 1220 may be referred to as a wireless apparatus.

The base station 1210 includes a processor 1211, a memory 1212, and a radio frequency (RF) unit 1213. The processor 1211 implements functions, processes and/or methods proposed in FIGS. 1 to 11. The layers of a radio interface protocol may be implemented by the processor 1211. The memory 1212 is connected to the processor 1211 and stores various types of information for driving the processor 2111. The RF unit 1213 is connected to the processor 1211 and transmits and/or receives a radio signal.

The UE 1220 includes a processor 1221, a memory 1222, and an RF unit 1223. The processor 1221 implements functions, processes and/or methods proposed in FIGS. 1 to 11. The layers of a radio interface protocol may be implemented by the processor 1221. The memory 1222 is connected to the processor 1221 and stores various types of information for driving the processor 1221. The RF unit 1223 is connected to the processor 1221 and transmits and/or receives a radio signal.

The memory 1212, 1222 may be inside or outside the processor 1211, 1221 and may be connected to the processor 1211, 1221 through various well-known means.

The memory 1212, 1222 may store a program for the processing and control of the processor 1211, 1221 and may temporarily store input/output information.

The memory 1212, 1222 may be used as a buffer.

Further, the base station 1210 and/or the UE 1220 may have a single antenna or multiple antennas.

Figure 13:
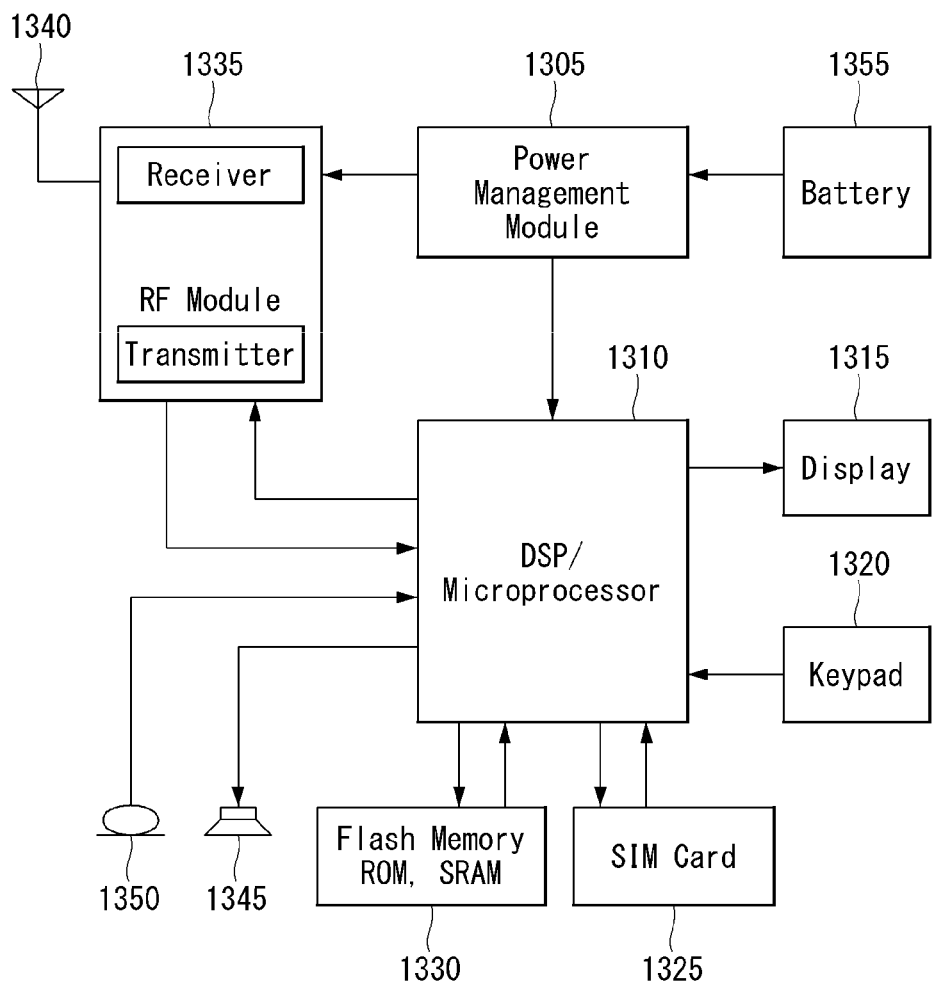
FIG. 13 illustrates a block configuration diagram of a communication device according to an embodiment of the disclosure.

FIG. 13 illustrates a block configuration diagram of a communication device according to an embodiment of the disclosure.

In particular, FIG. 13 illustrates in more detail the UE illustrated in FIG. 12.

Referring to FIG. 13, the UE may include a processor (or digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (optional), a speaker 1345, and a microphone 1350. The UE may also include a single antenna or multiple antennas.

The processor 1310 implements the functions, processes and/or methods proposed in FIGS. 1 to 12. The layers of a radio interface protocol may be implemented by the processor 1310.

The memory 1330 is connected to the processor 1310 and stores information related to operations of the processor 1310. The memory 1330 may be positioned inside or outside the processor 1310 and may be connected to the processors 1310 through various well-known means.

A user inputs instruction information, such as a telephone number, for example, by pressing (or touching) a button of the keypad 1320 or by voice activation using the microphone 2250. The processor 1310 receives the instruction information and processes the instruction information to perform an appropriate function, such as dialing a telephone number. Operational data may be extracted from the SIM card 1325 or the memory 1330. Further, the processor 1310 may display instruction information or operational information for the display 1315 for a user's reference and convenience.

The RF module 1335 is connected to the processor 1310 and transmits and/or receives an RF signal. The processor 1310 transmits instruction information to the RF module 1335 in order to initiate communication, for example, so that a radio signal configuring voice communication data is transmitted. The RF module 1335 is configured with a receiver and a transmitter to receive and transmit radio signals. The antenna 1340 functions to transmit and receive radio signals. Upon reception of a radio signal, the RF module 1335 may transmit a signal to be processed by the processor 1310 and convert a signal into a baseband. The processed signal may be converted into audible or readable information output via the speaker 1345.

Figure 14:
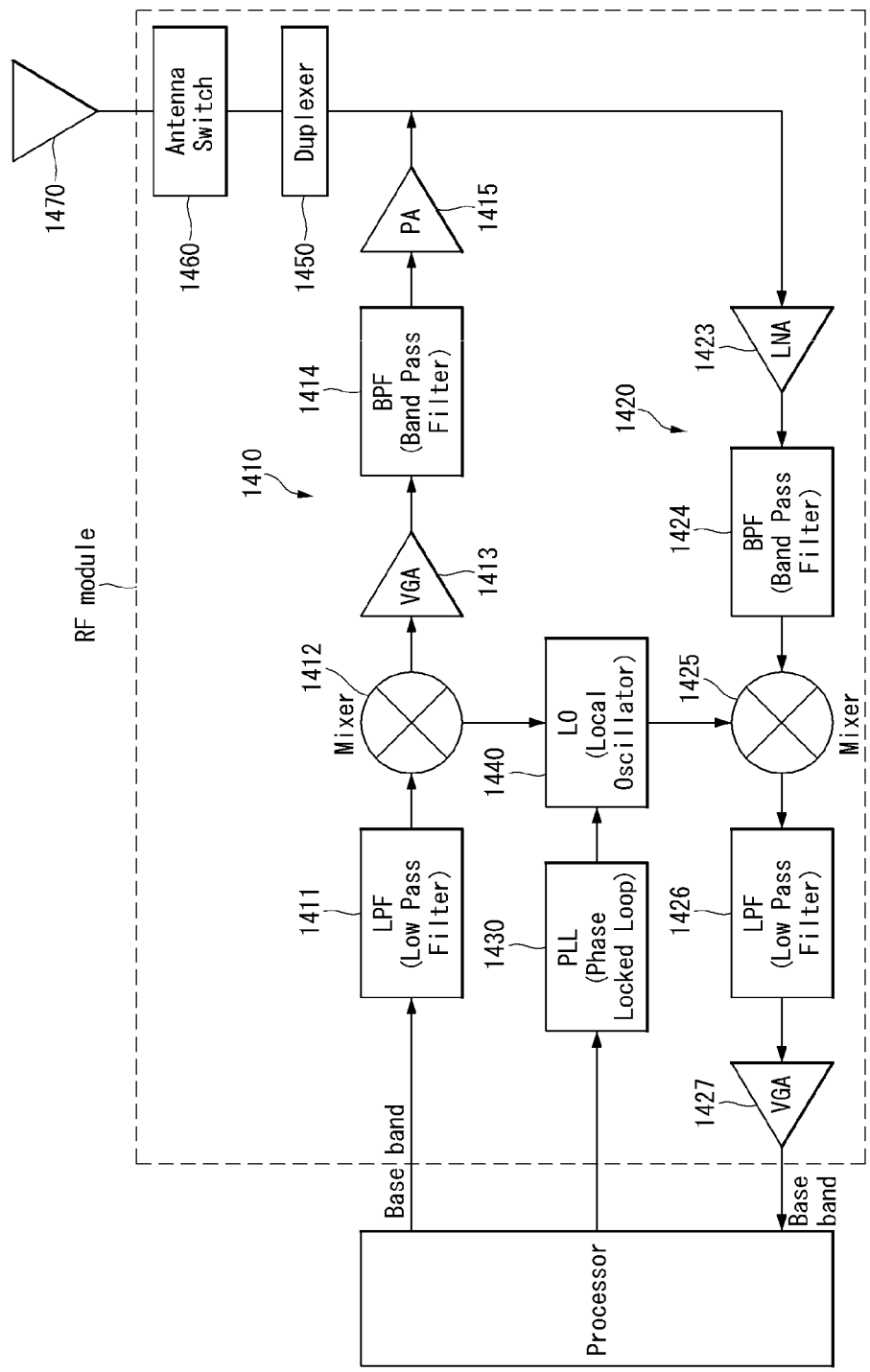
FIG. 14 illustrates an example of an RF module of a wireless communication apparatus to which a method proposed in the disclosure may be applied.

FIG. 14 illustrates an example of the RF module of a wireless communication apparatus to which a method proposed in the disclosure may be applied.

More specifically, FIG. 14 illustrates an example of an RF module which may be implemented in a frequency division duplex (FDD) system.

First, in a transmission path, the processor illustrated in FIGS. 12 and 13 processes data to be transmitted and provides an analog output signal to a transmitter 1410.

In the transmitter 1410, the analog output signal is filtered by a low pass filter (LPF) 1411 in order to remove an image caused by a digital-to-analog converter (ADC), is up-converted from a baseband to an RF by an up-converter (mixer) 1412, and is amplified by a variable gain amplifier (VGA) 1413. The amplified signal is filtered by a filter 1414, is additionally amplified by a power amplifier (PA) 1415, is routed through duplexer(s) 1450/antenna switch(es) 1460, and is transmitted through an antenna 1470.

Further, in a reception path, the antenna 1470 receives signals from the outside and provides the received signals. The signals are routed through the antenna switch(es) 1460/duplexers 1450 and are provided to a receiver 1420.

In the receiver 1420, the received signals are amplified by a low noise amplifier (LNA) 1423, are filtered by a bandpass filter 1424, and are down-converted from an RF to a baseband by a down-converter (mixer) 1425.

The down-converted signals are filtered by a low pass filter (LPF) 1426 and are amplified by a VGA 1427, thereby obtaining analog input signals. The analog input signals are provided to the processor illustrated in FIGS. 12 and 13.

Further, a local oscillator (LO) generator 1440 generates transmission and reception LO signals and provides them to the up-converter 1412 and the down-converter 1425, respectively.

In addition, a phase locked loop (PLL) 1430 receives control information from the processor in order to generate transmission and reception LO signals at appropriate frequencies and provides control signals to the LO generator 1440.

The circuits illustrated in FIG. 14 may be arranged differently from the configuration illustrated in FIG. 14.

Figure 15:
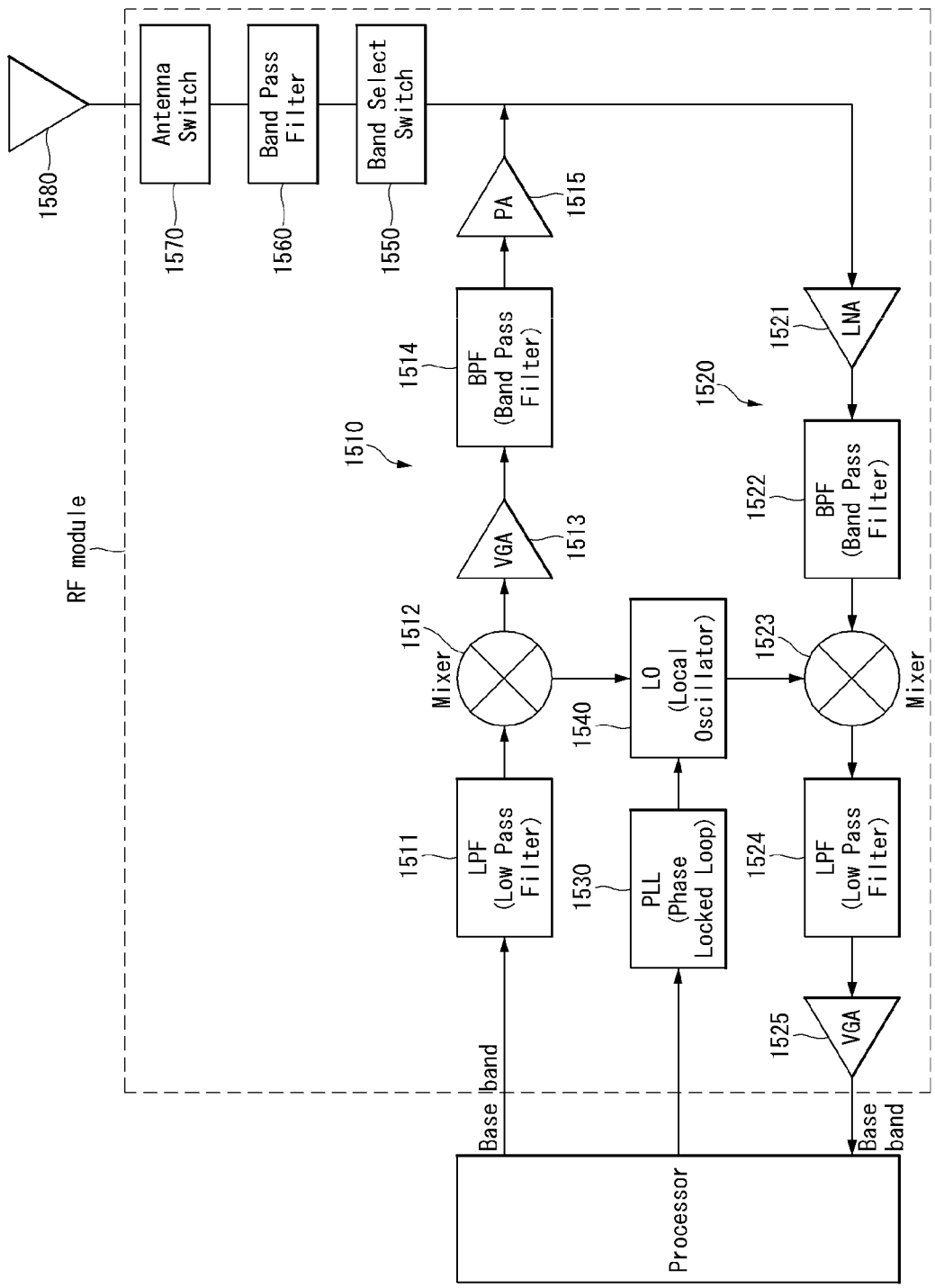
FIG. 15 illustrates another example of an RF module of a wireless communication apparatus to which a method proposed in the disclosure may be applied.

FIG. 15 illustrates another example of the RF module of a wireless communication apparatus to which a method proposed in the disclosure may be applied.

More specifically, FIG. 15 illustrates an example of an RF module which may be implemented in a time division duplex (TDD) system.

The transmitter 1510 and receiver 1520 of the RF module in the TDD system have the same structure as the transmitter and receiver of an RF module in an FDD system.

Hereinafter, only the structure of the RF module in the TDD system different from that in the FDD system will be described. For the same structure, reference is made to the description of FIG. 15.

A signal amplified by the power amplifier (PA) 1515 of the transmitter 1510 is routed through a band select switch 1550, a band pass filter (BPF) 1560, and antenna switch(es) 1570. The signal is transmitted via an antenna 1580.

Further, in a reception path, the antenna 1580 receives signals from the outside and provides the received signals. The signals are routed through the antenna switch(es) 1570, the band pass filter 1560, and the band select switch 1550, and are provided to the receiver 1520.

Figure 16:
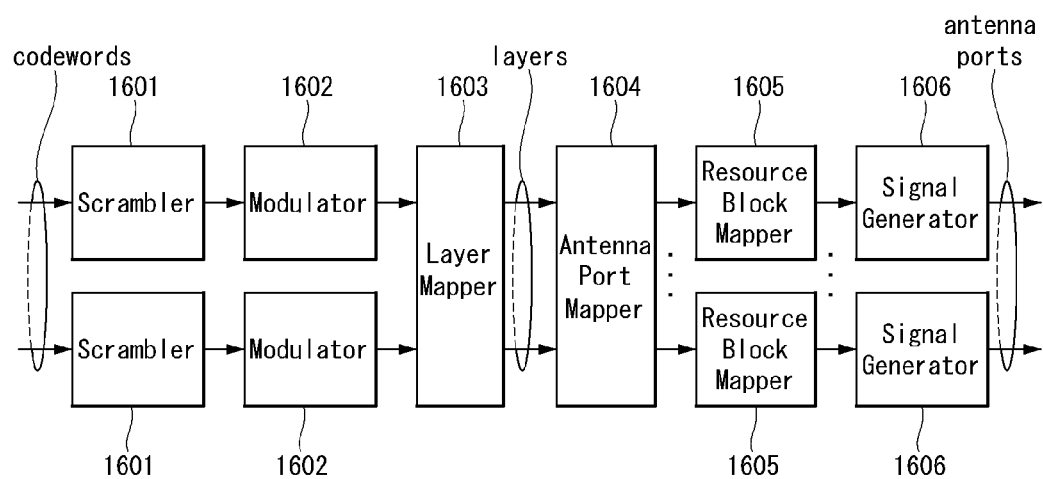
FIG. 16 is a diagram showing an example of a signal processing module to which methods proposed in the disclosure may be applied.

FIG. 16 is a diagram showing an example of a signal processing module to which methods proposed in the disclosure may be applied.

FIG. 16 shows an example of a signal processing module structure within a transmission apparatus.

Hereinafter, the UE or the base station of FIG. 12 may be referred to as a transmission apparatus or a reception apparatus.

In this case, signal processing may be performed in the processor of a base station/UE, such as the processor 1211, 1221 of FIG. 12.

Referring to FIG. 16, a transmission apparatus within a UE or a base station may include a scrambler 1601, a modulator 1602, a layer mapper 1603, an antenna port mapper 1604, a resource block mapper 1605, and a signal generator 1606.

The transmission apparatus may transmit one or more codewords. Coded bits within each codeword are scrambled by the scrambler 1601 and transmitted on a physical channel. The codeword may be denoted as a data stream, and may be equivalent to a transmission block, that is, a data block provided by a MAC layer.

The scrambled bits are modulated into complex-valued modulation symbols by the modulator 1602. The modulator 1602 may modulate the scrambled bits according to a modulation scheme, and may dispose the scrambled bits as complex-valued modulation symbols that represent locations on a signal constellation. The modulation scheme is not limited, and m-phase shift keying (m-PSK) or m-quadrature amplitude modulation (m-QAM) may be used for the modulation of the coded data. The modulator may be denoted as a modulation mapper.

The complex-valued modulation symbol may be mapped to one or more transmission layers by the layer mapper 1603. The complex-valued modulation symbol on each layer may be mapped by the antenna port mapper 1604 for transmission on an antenna port.

The resource block mapper 1605 may map a complex-valued modulation symbol for each antenna port to a proper resource element within a virtual resource block allocated for transmission. The resource block mapper may map the virtual resource block to a physical resource block according to a proper mapping scheme. The resource block mapper 1605 may allocate a complex-valued modulation symbol for each of the antenna ports to a proper subcarrier, and may multiplex them depending on a user.

The signal generator 1606 may generate a complex-valued time domain OFDM symbol signal by modulating a complex-valued modulation symbol, that is, an antenna-specific symbol for each of the antenna ports, according to a specific modulation scheme, for example, an orthogonal frequency division multiplexing (OFDM) method. The signal generator may perform inverse fast Fourier transform (IFFT) on an antenna-specific symbol. A cyclic prefix (CP) may be inserted into the time domain symbol on which IFFT has been performed. The OFDM symbol is transmitted to a reception apparatus through each transmission antenna via digital-to-analog conversion, frequency uplink conversion, etc. The signal generator may include an IFFT module, a CP inserter, a digital-to-analog converter (DAC), and a frequency uplink converter.

Figure 17:
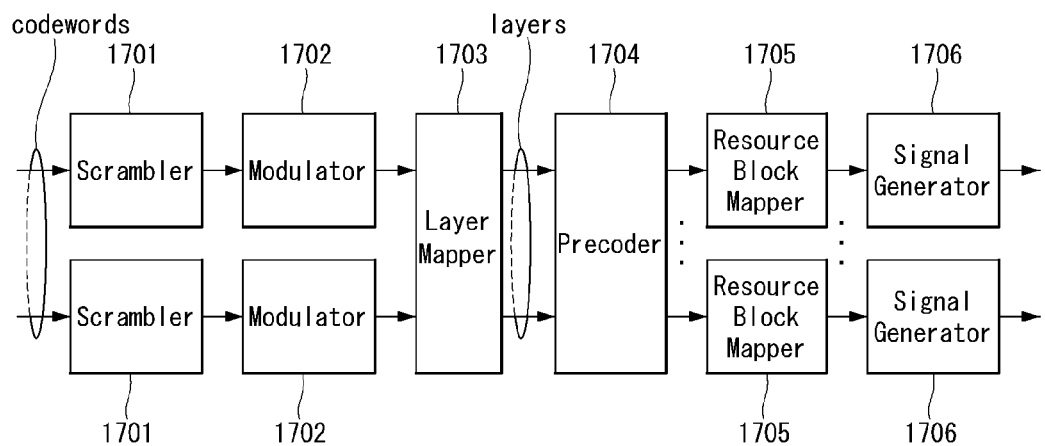
FIG. 17 is a diagram showing another example of the signal processing module to which methods proposed in the disclosure may be applied.

FIG. 17 is a diagram showing another example of a signal processing module to which methods proposed in the disclosure may be applied.

FIG. 17 illustrates another example of a signal processing module structure within a base station or a UE. In this case, signal processing may be performed in the processor of a UE/base station, such as the processor 1211, 1221 of FIG. 12.

Referring to FIG. 17, a transmission apparatus within a UE or a base station may include a scrambler 3101, a modulator 1702, a layer mapper 1703, a precoder 1704, a resource block mapper 1705, and a signal generator 1706.

The transmission apparatus may scramble coded bits within one codeword by the scrambler 1701, and may transmit the coded bits through a physical channel.

The scrambled bits are modulated into a complex-valued modulation symbol by the modulator 1702. The modulator may modulate the scrambled bits according to a predetermined modulation scheme, and may dispose the modulated bits as a complex-valued modulation symbol that represents a location on a signal constellation. The modulation scheme is not limited, and pi/2-binary phase shift keying (pi/2-BPSK), m-phase shift keying (m-PSK) or m-quadrature amplitude modulation (m-QAM) may be used for the modulation of the coded data.

The complex-valued modulation symbol may be mapped to one or more transmission layers by the layer mapper 1703.

A complex-valued modulation symbol on each layer may be precoded by the precoder 1704 for transmission on an antenna port. In this case, the precoder may perform transform precoding on the complex-valued modulation symbol and then perform precoding. Alternatively, the precoder may perform precoding without performing transform precoding. The precoder 1704 may process the complex-valued modulation symbol according to a MIMO method based on multiple transmission antennas, may output antenna-specific symbols, and may distribute the antenna-specific symbols to a corresponding resource block mapper 1705. The output z of the precoder 1704 may be obtained by multiplying the output y of the layer mapper 1703 by a precoding matrix W of N×M. In this case, N is the number of antenna ports, and M is the number of layers.

The resource block mapper 1705 may a demodulation modulation symbol for each antenna port to a proper resource element within a virtual resource block allocated for transmission.

The resource block mapper 1705 may allocate a complex-valued modulation symbol to a proper subcarrier, and may multiplex them depending on a user.

The signal generator 1706 may generate a complex-valued time domain orthogonal frequency division multiplexing (OFDM) symbol signal by modulating the complex-valued modulation symbol according to a specific modulation scheme for example, an OFDM method. The signal generator 1706 may perform inverse fast Fourier transform (IFFT) on an antenna-specific symbol. A cyclic prefix (CP) may be inserted into a time domain symbol on which IFFT has been performed. An OFDM symbol is transmitted to a reception apparatus through each transmission antenna via digital-to-analog conversion, frequency uplink conversion, etc. The signal generator 1706 may include an IFFT module, a CP inserter, a digital-to-analog converter (DAC), and a frequency uplink converter.

The signal processing process of the reception apparatus may be configured inversely to the signal processing process of the transmission apparatus. Specifically, the processor of the reception apparatus performs decoding and demodulation on a radio signal received from the outside through an antenna port(s) of the RF unit. The reception apparatus may include a plurality of multiple reception antennas. Each of signals received through the reception antennas is restored into a baseband signal and is restored into a data stream to be originally transmitted by the transmission apparatus through multiplexing and MIMO demodulation. The reception apparatus may include a signal restoring unit for restoring a received signal into a baseband signal, a multiplexer for multiplexing the received and processed signals by combining them, and a channel demodulator for demodulating a multiplexed signal stream into a corresponding codeword. The signal restoring unit, the multiplexer, and the channel demodulator may be configured as one integrated module or respective independent modules for performing such functions. More specifically, the signal restoring unit may include an analog-to-digital converter (ADC) for converting an analog signal into a digital signal, a CP remover for removing a CP from the digital signal, an FFT module for outputting a frequency domain symbol by applying fast Fourier transform (FFT) to the signal from which the CP has been removed, and a resource element demapper/equalizer for restoring the frequency domain symbol into an antenna-specific symbol. The antenna-specific symbol is restored into a transmission layer by the multiplexer. The transmission layer is restored into a codeword to be transmitted by the transmission apparatus by the channel demodulator.

A radio apparatus in the disclosure may be a base station, a network node, a transmitter UE, a receiver UE, a radio apparatus, a wireless communication apparatus, a vehicle, a vehicle with an automatic driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, an (external) device for diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

The UE in the disclosure may include a cellular phone, a smart phone, a laptop computer, a digital broadcast terminal, a personal digital assistants (PDA), a portable multimedia player (PMP), a navigator, a slate PC, a tablet PC, an ultrabook, a wearable device (e.g., a smart watch, a smart glass, a head mounted display (HMD)), a foldable device, or the like. For example, the HMD may be a display device which is worn on the head, and may be used to implement the VR or AR device.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

The scheme for performing a channel estimation in a wireless communication system of the disclosure has been illustrated as being applied to a 3GPP LTE/LTE-A system and a 5G system (New RAT system), but may be applied to various wireless communication systems in addition to the 3GPP LTE/LTE-A system and the 5G system.

The invention claimed is:

1. A method of monitoring, by a user equipment (UE), non-overlapped control channel elements (CCEs) in a wireless communication system, the method comprising:
receiving, from a base station, configuration information for a physical downlink control channel (PDCCH);
transmitting, to the base station, UE capability information for a maximum number of non-overlapped CCEs that the UE can monitor per monitoring span;
monitoring non-overlapped CCEs based on the maximum number of non-overlapped CCEs,
wherein the UE capability information includes information related to at least one interval between monitoring spans per numerology, and
wherein the maximum number of non-overlapped CCEs is determined based on the at least one interval between monitoring spans and the numerology.

2. The method of claim 1,
wherein the maximum number of non-overlapped CCEs is determined based on a length of the monitoring span.

3. The method of claim 1,
wherein the maximum number of non-overlapped CCEs is determined based on at least one of a service type, quality of service (QoS), a service requirement and/or a processing time.

4. The method of claim 1,
wherein the maximum number of non-overlapped CCEs is determined based on at least one of a physical downlink shared channel (PDSCH) processing time and/or physical uplink shared channel (PUSCH) preparation time of the UE.

5. The method of claim 1,
wherein the maximum number of non-overlapped CCEs is determined based on at least one of a transport block size, number of layers and/or number of resource blocks of a physical downlink shared channel (PDSCH) or a physical uplink shared channel (PUSCH).

6. The method of claim 1,
wherein a timing gap from the PDCCH to a physical downlink shared channel (PDSCH) is configured based on the maximum number of non-overlapped CCEs.

7. A user equipment (UE) configured to monitor non-overlapped control channel elements (CCEs) in a wireless communication system, the UE comprising:
    a transceiver for transmitting and receiving radio signals, and
    at least one processor functionally coupled to the transceiver,
    wherein the at least one processor is configured to:
    receive, from a base station, configuration information for a physical downlink control channel (PDCCH),
    transmit, to the base station, UE capability information for a maximum number of non-overlapped CCEs that the UE can monitor per monitoring span, and
    monitor non-overlapped CCEs based on the maximum number of non-overlapped CCEs,
    wherein the UE capability information includes information related to at least one interval between monitoring spans per numerology, and
    wherein the maximum number of non-overlapped CCEs is determined based on the at least one interval between monitoring spans and the numerology.

8. The UE of claim 7,
wherein the maximum number of non-overlapped CCEs is determined based on a length of the monitoring span.

9. The UE of claim 7,
wherein the maximum number of non-overlapped CCEs is determined based on at least one of a service type, quality of service (QoS), a service requirement and/or a processing time.

10. The UE of claim 7,
wherein the maximum number of non-overlapped CCEs is determined based on at least one of a physical downlink shared channel (PDSCH) processing time and/or physical uplink shared channel (PUSCH) preparation time of the UE.

11. The UE of claim 7,
wherein the maximum number of non-overlapped CCEs is determined based on at least one of a transport block size, number of layers and/or number of resource blocks of a physical downlink shared channel (PDSCH) or a physical uplink shared channel (PUSCH).

12. The UE of claim 7,
wherein a timing gap from the PDCCH to a physical downlink shared channel (PDSCH) is configured based on the maximum number of non-overlapped CCEs.

13. A processing apparatus configured to control a user equipment (UE) to monitor non-overlapped control channel elements (CCEs) in a wireless communication system, the processing apparatus comprising:
    at least one processor; and
    at least one computer memory operably connectable to the at least one processor and storing instructions that, when executed by the at least one processor, perform operations comprising:
    receiving, from a base station, configuration information for a physical downlink control channel (PDCCH);
    transmitting, to the base station, UE capability information for a maximum number of non-overlapped CCEs that the UE can monitor per monitoring span; and
    monitoring non-overlapped CCEs based on the maximum number of non-overlapped CCEs,
    wherein the UE capability information includes information related to at least one interval between monitoring spans per numerology, and
    wherein the maximum number of non-overlapped CCEs is determined based on the at least one interval between monitoring spans and the numerology.

14. A computer-readable storage medium storing at least one instruction which, when executed by at least one processor, perform operations comprising:
    receiving, from a base station, configuration information for a physical downlink control channel (PDCCH),
    transmitting, to the base station, user equipment (UE) capability information for a maximum number of non-overlapped control channel elements (CCEs) that a UE can monitor per monitoring span, and
    monitoring non-overlapped CCEs based on the maximum number of non-overlapped CCEs,
    wherein the UE capability information includes information related to at least one interval between monitoring spans per numerology, and
    wherein the maximum number of non-overlapped CCEs is determined based on the at least one interval between monitoring spans and the numerology.

* * * * *